(12) United States Patent
Tang et al.

(10) Patent No.: US 9,999,048 B2
(45) Date of Patent: Jun. 12, 2018

(54) METHOD FOR TRANSMITTING SERVICE DATA, TERMINAL, AND BASE STATION

(71) Applicant: Huawei Technologies Co., Ltd., Shenzhen (CN)

(72) Inventors: Zhenfei Tang, Shanghai (CN); Yuanjie Li, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 91 days.

(21) Appl. No.: 15/051,449

(22) Filed: Feb. 23, 2016

(65) Prior Publication Data

US 2016/0174224 A1 Jun. 16, 2016

Related U.S. Application Data

(63) Continuation of application No. PCT/CN2013/082223, filed on Aug. 23, 2013.

(51) Int. Cl.
*H04J 3/08* (2006.01)
*H04W 72/04* (2009.01)
*H04L 1/18* (2006.01)

(52) U.S. Cl.
CPC ......... *H04W 72/0446* (2013.01); *H04L 1/189* (2013.01); *H04L 1/1854* (2013.01);
(Continued)

(58) Field of Classification Search
CPC .................................................. H04W 72/0446
See application file for complete search history.

(56) References Cited

U.S. PATENT DOCUMENTS 8,448,037 B2 * 5/2013 Bergquist .............. H04L 1/1812
714/748
8,982,755 B1 * 3/2015 Shah ..................... H04L 1/1896
370/311
(Continued)

FOREIGN PATENT DOCUMENTS

CN 101651528 A 2/2010
CN 101772175 A 7/2010
(Continued)

OTHER PUBLICATIONS

"Coverage analysis of LTE UL physical channels," 3GPP TSG-RAN WG1 #68, Dresden, Germany, R1-120211, pp. 2-6, $3^{rd}$ Generation Partnership Project, Valbonne, France (Feb. 6-12, 2012).
(Continued)

*Primary Examiner* — Guang W Li
(74) *Attorney, Agent, or Firm* — Leydig, Voit & Mayer, Ltd.

(57) ABSTRACT

Embodiments of the present disclosure provide a method for transmitting service data, a terminal, and a base station. The method includes: a terminal sends a transmission attribute of the terminal to a base station, wherein the transmission attribute of the terminal is used for a determination of a transmission time interval (TTI) bundling transmission policy of the terminal; receives a TTI bundling transmission indication from the base station; determines a TTI bundling transmission policy of the terminal according to the transmission attribute of the terminal; and sends service data to the base station in a TTI bundling transmission manner according to the TTI bundling transmission policy of the terminal. Technical solutions provided in the embodiments of the present disclosure are used to enlarge coverage of medium-data rate and high-data rate services.

20 Claims, 9 Drawing Sheets

(52) U.S. Cl.
CPC ......... *H04L 1/1887* (2013.01); *H04W 72/042* (2013.01); *H04W 72/048* (2013.01)

(56) References Cited

U.S. PATENT DOCUMENTS

| | | | | |
|---|---|---|---|---|
| 9,357,546 | B1* | 5/2016 | Marupaduga | H04W 72/0446 |
| 2011/0141991 | A1 | 6/2011 | Gao | |
| 2011/0170504 | A1* | 7/2011 | Xu | H04L 5/00 370/329 |
| 2012/0020309 | A1* | 1/2012 | Malladi | H04W 72/0446 370/329 |
| 2012/0147830 | A1* | 6/2012 | Lohr | H04W 72/042 370/329 |
| 2013/0083753 | A1* | 4/2013 | Lee | H04W 72/0453 370/329 |
| 2013/0250924 | A1* | 9/2013 | Chen | H04L 1/1819 370/336 |
| 2013/0294363 | A1* | 11/2013 | Feng | H04W 74/008 370/329 |
| 2013/0329701 | A1* | 12/2013 | Bajzec | H04L 1/1887 370/336 |
| 2014/0010105 | A1 | 1/2014 | Sakabe | |
| 2014/0040694 | A1* | 2/2014 | Verma | H04L 1/1812 714/748 |
| 2014/0355533 | A1* | 12/2014 | Kuo | H04L 5/0053 370/329 |
| 2015/0312371 | A1* | 10/2015 | Han | H04L 1/0013 370/281 |

FOREIGN PATENT DOCUMENTS

| | | |
|---|---|---|
| CN | 102131297 A | 7/2011 |
| EP | 2265077 A1 | 12/2010 |
| EP | 2688336 A1 | 1/2014 |
| JP | 2012530434 A | 11/2012 |
| WO | wo 2010145799 A1 | 12/2010 |
| WO | WO 2012127591 A1 | 9/2012 |

OTHER PUBLICATIONS

"Proposal on the conclusions for coverage enhancement," 3GPP TSG RAN WG1 Meeting #69, Prague, Czech Republic, R1-122528, pp. 2-6, $3^{rd}$ Generation Partnership Project, Valbonne, France (May 21-25, 2012).

"Coverage enhancement for TTI bundling," 3GPP TSG-RAN WG1 Meeting #69, Prague, Czech Republic, R1-122719, pp. 2-8, $3^{rd}$ Generation Partnership Project, Valbonne, France (May 21-25, 2012).

"New UE category/type for MTC UEs," 3GPP TSG RAN WG1 Meeting #74, Barcelona, Spain, R1-133128, pp. 2-5, $3^{rd}$ Generation Partnership Project, Valbonne, France (Aug. 19-23, 2013).

"Data Channel Coverage Enhancement," 3GPP TSG-RAN WG1 #72bis, Chicago, Illinois, R1-131399, $3^{rd}$ Generation Partnership Project, Valbonne, France (Apr. 15-19, 2013).

"Discussion on PRACH Coverage Enhancement for Low Cost MTC," 3GPP TSG RAN WG1 Meeting #74, Barcelona, Spain, R1-132930, $3^{rd}$ Generation Partnership Project, Valbonne, France (Aug. 19-23, 2013).

"Initial procedure and consideration points for the coverage enhancement of MTC UEs," 3GPP TSG RAN WG1 #74, Barcelona, Spain, R1-133370, $3^{rd}$ Generation Partnership Project, Valbonne, France (Aug. 19-23, 2013).

"Control of amount of coverage enhancement for MTC UE," 3GPP TSG-RAN WG1 Meeting #74, Barcelona, Spain, R1-133421, $3^{rd}$ Generation Partnership Project, Valbonne, France (Aug. 19-23, 2013).

"Mechanism for Identifying and Communicating Coverage Shortfall," 3GPP TSG RAN1#74, Barcelona, Spain, R1-133482, $3^{rd}$ Generation Partnership Project, Valbonne, France (Aug. 19-23, 2013).

"Further discussion on coverage improvement for the data channels," 3GPP TSG RAN WG1 Meeting #74, Barcelona ,Spain, R1-133513, $3^{rd}$ Generation Partnership Project, Valbonne, France (Aug. 19-23, 2013).

Ku "Scheduling in LTE," Adaptive Signal Processing and Information Theory Research Group, pp. 1-22, XP55429210, (Apr. 27, 2012).

Nurulanis et al.,"Performance Analysis of the Energy Consumption of the Scheduling Algorithms in Long Term Evolution LTE (Long Term Evolution) Networks," Wireless Communication Technology Group, pp. 55-60, University of Technology Mara, Malaysia (Accepted Feb. 18, 2016).

EP 13891778.6, Office Action, dated Dec. 5, 2017.

* cited by examiner

United States Patent US 9,999,048 B2

METHOD FOR TRANSMITTING SERVICE DATA, TERMINAL, AND BASE STATION

CROSS-REFERENCE TO RELATED APPLICATIONS

This application is a continuation of International Patent Application No. PCT/CN2013/082223, filed on Aug. 23, 2013, which is hereby incorporated by reference in its entirety.

TECHNICAL FIELD

The present disclosure relates to wireless communications technologies, and in particular, to a method for transmitting service data, a terminal, and a base station.

BACKGROUND

In a communications system, for example, a Long Term Evolution (LTE) system, a transmission time interval (TTI) is 1 ms. At present, to enlarge coverage, a transmission time interval bundling (TTI bundling) transmission manner is introduced in LTE. In the transmission manner, a terminal may transmit a data packet to a base station by using four TTIs, and a time length of a round trip time (RTT) is equal to 16 TTIs, that is, time intervals between an initial transmission and a retransmission and between one retransmission and another retransmission of the data packet are 16 TTIs, so as to achieve the objective of enlarging coverage. In addition, in the prior art, to reduce complexity of a terminal, when the TTI bundling transmission manner is used, in all of LTE Rel-8 to LTE Rel-11 protocols, a quantity of resources used by the terminal is limited, and the terminal uses three resource blocks (RB) at most. The resource blocks may include physical resource blocks or virtual resource blocks.

However, because the terminal uses a relatively small quantity of frequency domain resources and time domain resources, causing that the TTI bundling transmission manner can only support a low-data rate service, and is not applicable to both a medium-data rate service and a high-data rate service, which accordingly do not have an advantage of enlarged coverage brought by the TTI bundling transmission manner, at present, coverage of the medium-data rate and high-data rate services is severely limited.

SUMMARY

In view of this, embodiments of the present disclosure provide a method for transmitting service data, a terminal, and a base station, so as to enlarge coverage of medium-data rate and high-data rate services.

An embodiment of the present disclosure provides a method for transmitting service data, including:

receiving, by a base station, a transmission attribute of a terminal that is sent by the terminal;

determining, by the base station, a TTI bundling transmission policy of the terminal according to the transmission attribute of the terminal;

sending, by the base station, a TTI bundling transmission indication to the terminal, so that the terminal determines the TTI bundling transmission policy of the terminal according to the transmission attribute of the terminal, and sends service data to the base station in a TTI bundling transmission manner according to the TTI bundling transmission policy of the terminal; and receiving, by the base station according to the TTI bundling transmission policy, the service data sent by the terminal.

In the method, the determining, by the base station, a TTI bundling transmission policy of the terminal according to the transmission attribute of the terminal includes:

when the transmission attribute of the terminal is that the terminal supports a TTI bundle extended transmission manner, determining, by the base station, that when the terminal sends service data to the base station in the TTI bundling transmission manner, a maximum value of a quantity of resource blocks occupied by the terminal is A, where $3 < A \leq 100$, and A is an integer.

In the method, the determining, by the base station, a TTI bundling transmission policy of the terminal according to the transmission attribute of the terminal includes:

when the transmission attribute of the terminal is that the terminal supports a TTI bundle extended transmission manner, determining, by the base station, that when the terminal sends service data to the base station in the TTI bundling transmission manner, a maximum value of a quantity of resource blocks occupied by the terminal is B and a maximum value of a size of a transport block occupied by the terminal is C, where $3 < B \leq 100$, $16 \leq C \leq 75376$, and B and C are integers.

In the method, the determining, by the base station, a TTI bundling transmission policy of the terminal according to the transmission attribute of the terminal includes:

when the transmission attribute of the terminal is a terminal category, when the terminal category is equal to 0, 1, or 9, determining, by the base station, that when the terminal sends service data to the base station in the TTI bundling transmission manner, a maximum value of a quantity of resource blocks occupied by the terminal is D; or when the terminal category is equal to 5, 6, 7, or 8, determining, by the base station, that when the terminal sends service data to the base station in the TTI bundling transmission manner, a maximum value of a quantity of resource blocks occupied by the terminal is E, where $3 \leq D \leq 100$, $3 \leq E \leq 100$, D is not equal to E, and D and E are integers.

In the method, the determining, by the base station, a TTI bundling transmission policy of the terminal according to the transmission attribute of the terminal includes:

when the transmission attribute of the terminal is a terminal category, when the terminal category is equal to i, determining, by the base station, that when the terminal sends service data to the base station in the TTI bundling transmission manner, a maximum value of a quantity of resource blocks occupied by the terminal is F(i), where at least two F(i)s are not equal, $3 \leq F(i) \leq 100$, F(i) is an integer, $1 \leq i \leq 8$, and i is an integer.

In the method, the determining, by the base station, a TTI bundling transmission policy of the terminal according to the transmission attribute of the terminal includes:

when the transmission attribute of the terminal is a terminal category, when the terminal category is a machine-to-machine communication terminal, determining, by the base station, that when the terminal sends service data to the base station in the TTI bundling transmission manner, a maximum value of a quantity of resource blocks occupied by the terminal is where $1 \leq G \leq 3$, and G is an integer; or when the terminal category is not a machine-to-machine communication terminal, a maximum value of a quantity of resource blocks occupied by the terminal is H, where $3 < H \leq 100$, and H is an integer.

In the method, the determining, by the base station, a TTI bundling transmission policy of the terminal according to the transmission attribute of the terminal includes:

when the transmission attribute of the terminal is a terminal category, when the terminal category is equal to i, determining, by the base station, that when the terminal sends service data to the base station in the TTI bundling transmission manner, a maximum value of a size of a transport block occupied by the terminal is I(i), where at least two I(i)s are not equal, $16 \leq I(i) \leq 75376$, I(i) is an integer, $1 \leq i \leq 8$, and i is an integer.

In the method, the determining, by the base station, a TTI bundling transmission policy of the terminal according to the transmission attribute of the terminal includes:

when the transmission attribute of the terminal is a terminal category, when the terminal category is a machine-to-machine communication terminal, determining, by the base station, that when the terminal sends service data to the base station in the TTI bundling transmission manner, a maximum value of a size of a transport block occupied by the terminal is L(i), where $1 \leq L(i) \leq 1000$, and L(i) is an integer; or when the terminal category is not a machine-to-machine communication terminal, a maximum value of a size of a transport block occupied by the terminal is M(i), where $16 \leq M(i) \leq 75376$, and M(i) is an integer.

In the method, the determining, by the base station, a TTI bundling transmission policy of the terminal according to the transmission attribute of the terminal includes:

when the transmission attribute of the terminal is a terminal category, when the terminal category is equal to i, determining, by the base station, that when the terminal sends service data to the base station in the TTI bundling transmission manner, a quantity of TTIs in a TTI bundle occupied by the terminal is K(i), where at least two K(i)s are not equal, $1 \leq K(i) \leq 20$, K(i) is an integer, $1 \leq i \leq 8$, and i is an integer.

In the method, the determining, by the base station, a TTI bundling transmission policy of the terminal according to the transmission attribute of the terminal includes:

when the transmission attribute of the terminal is a terminal category, determining, by the base station according to the terminal category, a time length of an RTT in a TTI bundle occupied by the terminal when the terminal sends service data to the base station in the TTI bundling transmission manner.

In the method, the determining, by the base station, a TTI bundling transmission policy of the terminal according to the transmission attribute of the terminal includes:

when the transmission attribute of the terminal is a TTI bundling capability supported by the terminal, determining, by the base station according to the TTI bundling capability supported by the terminal, a quantity of TTIs in a TTI bundle occupied by the terminal when the terminal sends service data to the base station in the TTI bundling transmission manner.

In the method, the determining, by the base station, a TTI bundling transmission policy of the terminal according to the transmission attribute of the terminal includes:

when the transmission attribute of the terminal is a TTI bundling capability supported by the terminal, determining, by the base station according to the TTI bundling capability supported by the terminal, a time length of an RTT in a TTI bundle occupied by the terminal when the terminal sends service data to the base station in the TTI bundling transmission manner.

An embodiment of the present disclosure further provides a method for transmitting service data, including:

sending, by a terminal, a transmission attribute of the terminal to a base station, so that the base station determines a TTI bundling transmission policy of the terminal according to the transmission attribute of the terminal;

receiving, by the terminal, a TTI bundling transmission indication sent by the base station;

determining, by the terminal, the TTI bundling transmission policy of the terminal according to the transmission attribute of the terminal; and sending, by the terminal, service data to the base station in a TTI bundling transmission manner according to the TTI bundling transmission policy of the terminal, so that the base station receives, according to the TTI bundling transmission policy of the terminal, the service data sent by the terminal.

In the method, the determining, by the terminal, the TTI bundling transmission policy of the terminal according to the transmission attribute of the terminal includes:

when the transmission attribute of the terminal is that the terminal supports a TTI bundle extended transmission manner, determining, by the terminal, that when the terminal sends service data to the base station in the TTI bundling transmission manner, a maximum value of a quantity of resource blocks occupied by the terminal is A, where $3 < A \leq 100$, and A is an integer.

In the method, the determining, by the terminal, the TTI bundling transmission policy of the terminal according to the transmission attribute of the terminal includes:

when the transmission attribute of the terminal is that the terminal supports a TTI bundle extended transmission manner, determining, by the terminal, that when the terminal sends service data to the base station in the TTI bundling transmission manner, a maximum value of a quantity of resource blocks occupied by the terminal is B and a maximum value of a size of a transport block occupied by the terminal is C, where $3 < B \leq 100$, $16 \leq C \leq 75376$, and B and C are integers.

In the method, the determining, by the terminal, the TTI bundling transmission policy of the terminal according to the transmission attribute of the terminal includes:

when the transmission attribute of the terminal is a terminal category, when the terminal category is equal to 0, 1, or 9, determining, by the terminal, that when the terminal sends service data to the base station in the TTI bundling transmission manner, a maximum value of a quantity of resource blocks occupied by the terminal is D; or when the terminal category is equal to 5, 6, 7, or 8, determining, by the terminal, that when the terminal sends service data to the base station in the TTI bundling transmission manner, a maximum value of a quantity of resource blocks occupied by the terminal is E, where $3 \leq D \leq 100$, $3 \leq E \leq 100$, D is not equal to E, and D and E are integers.

In the method, the determining, by the terminal, the TTI bundling transmission policy of the terminal according to the transmission attribute of the terminal includes:

when the transmission attribute of the terminal is a terminal category, when the terminal category is equal to i, determining, by the terminal, that when the terminal sends service data to the base station in the TTI bundling transmission manner, a maximum value of a quantity of resource blocks occupied by the terminal is F(i), where at least two F(i)s are not equal, $3 \leq F(i) \leq 100$, F(i) is an integer, $1 \leq i \leq 8$, and i is an integer.

In the method, the determining, by the terminal, the TTI bundling transmission policy of the terminal according to the transmission attribute of the terminal includes:

when the transmission attribute of the terminal is a terminal category, when the terminal category is a machine-to-machine communication terminal, determining, by the terminal, that when the terminal sends service data to the base station in the TTI bundling transmission manner, a maximum value of a quantity of resource blocks occupied by the terminal is where $1 \leq G \leq 3$, and G is an integer; or when the terminal category is not a machine-to-machine communication terminal, a maximum value of a quantity of resource blocks occupied by the terminal is H, where $3 < H \leq 100$, and H is an integer.

In the method, the determining, by the terminal, the TTI bundling transmission policy of the terminal according to the transmission attribute of the terminal includes:

when the transmission attribute of the terminal is a terminal category, when the terminal category is equal to i, determining, by the terminal, that when the terminal sends service data to the base station in the TTI bundling transmission manner, a maximum value of a size of a transport block occupied by the terminal is I(i), where at least two I(i)s are not equal, $16 \leq I(i) \leq 75376$, I(i) is an integer, $1 \leq i \leq 8$, and i is an integer.

In the method, the determining, by the terminal, the TTI bundling transmission policy of the terminal according to the transmission attribute of the terminal includes:

when the transmission attribute of the terminal is a terminal category, when the terminal category is a machine-to-machine communication terminal, determining, by the terminal, that when the terminal sends service data to the base station in the TTI bundling transmission manner, a maximum value of a size of a transport block occupied by the terminal is L(i), where $1 \leq L(i) \leq 1000$, and L(i) is an integer; or when the terminal category is not a machine-to-machine communication terminal, a maximum value of a size of a transport block occupied by the terminal is M(i), where $16 \leq M(i) \leq 75376$, and M(i) is an integer.

In the method, the determining, by the terminal, the TTI bundling transmission policy of the terminal according to the transmission attribute of the terminal includes:

when the transmission attribute of the terminal is a terminal category, when the terminal category is equal to i, determining, by the terminal, that when the terminal sends service data to the base station in the TTI bundling transmission manner, a quantity of TTIs in a TTI bundle occupied by the terminal is K(i), where at least two K(i)s are not equal, $1 \leq K(i) \leq 20$, K(i) is an integer, $1 \leq i \leq 8$, and i is an integer.

In the method, the determining, by the terminal, the TTI bundling transmission policy of the terminal according to the transmission attribute of the terminal includes:

when the transmission attribute of the terminal is a terminal category, determining, by the terminal according to the terminal category, a time length of an RTT in a TTI bundle occupied by the terminal when the terminal sends service data to the base station in the TTI bundling transmission manner.

In the method, the determining, by the terminal, the TTI bundling transmission policy of the terminal according to the transmission attribute of the terminal includes:

when the transmission attribute of the terminal is a TTI bundling capability supported by the terminal, determining, by the terminal according to the TTI bundling capability supported by the terminal, a quantity of TTIs in a TTI bundle occupied by the terminal when the terminal sends service data to the base station in the TTI bundling transmission manner.

In the method, the determining, by the terminal, the TTI bundling transmission policy of the terminal according to the transmission attribute of the terminal includes:

when the transmission attribute of the terminal is a TTI bundling capability supported by the terminal, determining, by the terminal according to the TTI bundling capability supported by the terminal, a time length of an RTT in a TTI bundle occupied by the terminal when the terminal sends service data to the base station in the TTI bundling transmission manner.

An embodiment of the present disclosure further provides a base station, including:

a first receiving unit, configured to receive a transmission attribute of a terminal that is sent by the terminal;

a processing unit, configured to determine a TTI bundling transmission policy of the terminal according to the transmission attribute of the terminal;

a sending unit, configured to send a TTI bundling transmission indication to the terminal, so that the terminal determines the TTI bundling transmission policy of the terminal according to the transmission attribute of the terminal, and sends service data to the base station in a TTI bundling transmission manner according to the TTI bundling transmission policy of the terminal; and a second receiving unit, configured to receive, according to the TTI bundling transmission policy, the service data sent by the terminal.

In the base station, the determining, by the processing unit, a TTI bundling transmission policy of the terminal according to the transmission attribute of the terminal includes:

when the transmission attribute of the terminal is that the terminal supports a TTI bundle extended transmission manner, determining that when the terminal sends service data to the base station in the TTI bundling transmission manner, a maximum value of a quantity of resource blocks occupied by the terminal is A, where $3 < A \leq 100$, and A is an integer.

In the base station, the determining, by the processing unit, a TTI bundling transmission policy of the terminal according to the transmission attribute of the terminal includes:

when the transmission attribute of the terminal is that the terminal supports a TTI bundle extended transmission manner, determining that when the terminal sends service data to the base station in the TTI bundling transmission manner, a maximum value of a quantity of resource blocks occupied by the terminal is B and a maximum value of a size of a transport block occupied by the terminal is C, where $3 < B \leq 100$, $16 \leq C \leq 75376$, and B and C are integers.

In the base station, the determining, by the processing unit, a TTI bundling transmission policy of the terminal according to the transmission attribute of the terminal includes:

when the transmission attribute of the terminal is a terminal category, when the terminal category is equal to 0, 1, or 9, determining that when the terminal sends service data to the base station in the TTI bundling transmission manner, a maximum value of a quantity of resource blocks occupied by the terminal is D; or when the terminal category is equal to 5, 6, 7, or 8, determining that when the terminal sends service data to the base station in the TTI bundling transmission manner, a maximum value of a quantity of resource blocks occupied by the terminal is E, where $3 \leq D \leq 100$, $3 \leq E \leq 100$, D is not equal to E, and D and E are integers.

In the base station, the determining, by the processing unit, a TTI bundling transmission policy of the terminal according to the transmission attribute of the terminal includes:

when the transmission attribute of the terminal is a terminal category, when the terminal category is equal to i, determining that when the terminal sends service data to the base station in the TTI bundling transmission manner, a maximum value of a quantity of resource blocks occupied by the terminal is F(i), where at least two F(i)s are not equal, $3 \leq F(i) \leq 100$, F(i) is an integer, $1 \leq i \leq 8$, and i is an integer.

In the base station, the determining, by the processing unit, a TTI bundling transmission policy of the terminal according to the transmission attribute of the terminal includes:

when the transmission attribute of the terminal is a terminal category, when the terminal category is a machine-to-machine communication terminal, determining that when the terminal sends service data to the base station in the TTI bundling transmission manner, a maximum value of a quantity of resource blocks occupied by the terminal is where $1 \leq G \leq 3$, and G is an integer; or when the terminal category is not a machine-to-machine communication terminal, a maximum value of a quantity of resource blocks occupied by the terminal is H, where $3 < H \leq 100$, and H is an integer.

In the base station, the determining, by the processing unit, a TTI bundling transmission policy of the terminal according to the transmission attribute of the terminal includes:

when the transmission attribute of the terminal is a terminal category, when the terminal category is equal to i, determining that when the terminal sends service data to the base station in the TTI bundling transmission manner, a maximum value of a size of a transport block occupied by the terminal is I(i), where at least two I(i)s are not equal, $16 \leq I(i) \leq 75376$, I(i) is an integer, $1 \leq i \leq 8$, and i is an integer.

In the base station, the determining, by the processing unit, a TTI bundling transmission policy of the terminal according to the transmission attribute of the terminal includes:

when the transmission attribute of the terminal is a terminal category, when the terminal category is a machine-to-machine communication terminal, determining that when the terminal sends service data to the base station in the TTI bundling transmission manner, a maximum value of a size of a transport block occupied by the terminal is L(i), where $1 \leq L(i) \leq 1000$, and L(i) is an integer; or when the terminal category is not a machine-to-machine communication terminal, a maximum value of a size of a transport block occupied by the terminal is M(i), where $16 \leq M(i) \leq 75376$, and M(i) is an integer.

In the base station, the determining, by the processing unit, a TTI bundling transmission policy of the terminal according to the transmission attribute of the terminal includes:

when the transmission attribute of the terminal is a terminal category, when the terminal category is equal to i, determining that when the terminal sends service data to the base station in the TTI bundling transmission manner, a quantity of TTIs in a TTI bundle occupied by the terminal is K(i), where at least two K(i)s are not equal, $1 \leq K(i) \leq 20$, K(i) is an integer, $1 \leq i \leq 8$, and i is an integer.

In the base station, the determining, by the processing unit, a TTI bundling transmission policy of the terminal according to the transmission attribute of the terminal includes:

when the transmission attribute of the terminal is a terminal category, determining, according to the terminal category, a time length of an RTT in a TTI bundle occupied by the terminal when the terminal sends service data to the base station in the TTI bundling transmission manner.

In the base station, the determining, by the processing unit, a TTI bundling transmission policy of the terminal according to the transmission attribute of the terminal includes:

when the transmission attribute of the terminal is a TTI bundling capability supported by the terminal, determining, according to the TTI bundling capability supported by the terminal, a quantity of TTIs in a TTI bundle occupied by the terminal when the terminal sends service data to the base station in the TTI bundling transmission manner.

In the base station, the determining, by the processing unit, a TTI bundling transmission policy of the terminal according to the transmission attribute of the terminal includes:

when the transmission attribute of the terminal is a TTI bundling capability supported by the terminal, determining, according to the TTI bundling capability supported by the terminal, a time length of an RTT in a TTI bundle occupied by the terminal when the terminal sends service data to the base station in the TTI bundling transmission manner.

An embodiment of the present disclosure further provides a terminal, including:

a first sending unit, configured to send a transmission attribute of the terminal to a base station, so that the base station determines a TTI bundling transmission policy of the terminal according to the transmission attribute of the terminal;

a receiving unit, configured to receive a TTI bundling transmission indication sent by the base station;

a processing unit, configured to determine the TTI bundling transmission policy of the terminal according to the transmission attribute of the terminal; and a second sending unit, configured to send service data to the base station in a TTI bundling transmission manner according to the TTI bundling transmission policy of the terminal, so that the base station receives, according to the TTI bundling transmission policy of the terminal, the service data sent by the terminal.

In the terminal, the determining, by the processing unit, the TTI bundling transmission policy of the terminal according to the transmission attribute of the terminal includes:

when the transmission attribute of the terminal is that the terminal supports a TTI bundle extended transmission manner, determining that when the terminal sends service data to the base station in the TTI bundling transmission manner, a maximum value of a quantity of resource blocks occupied by the terminal is A, where $3 < A \leq 100$, and A is an integer.

In the terminal, the determining, by the processing unit, the TTI bundling transmission policy of the terminal according to the transmission attribute of the terminal includes:

when the transmission attribute of the terminal is that the terminal supports a TTI bundle extended transmission manner, determining that when the terminal sends service data to the base station in the TTI bundling transmission manner, a maximum value of a quantity of resource blocks occupied by the terminal is B and a maximum value of a size of a transport block occupied by the terminal is C, where $3 < B \leq 100$, $16 \leq C \leq 75376$, and B and C are integers.

In the terminal, the determining, by the processing unit, the TTI bundling transmission policy of the terminal according-ing to the transmission attribute of the terminal includes:

when the transmission attribute of the terminal is a terminal category, when the terminal category is equal to 0, 1, or 9, determining that when the terminal sends service data to the base station in the TTI bundling transmission manner, a maximum value of a quantity of resource blocks occupied by the terminal is D; or when the terminal category is equal to 5, 6, 7, or 8, determining that when the terminal sends service data to the base station in the TTI bundling transmission manner, a maximum value of a quantity of resource blocks occupied by the terminal is E, where $3 \leq D \leq 100$, $3 \leq E \leq 100$, D is not equal to E, and D and E are integers.

In the terminal, the determining, by the processing unit, the TTI bundling transmission policy of the terminal according to the transmission attribute of the terminal includes:

when the transmission attribute of the terminal is a terminal category, when the terminal category is equal to i, determining that when the terminal sends service data to the base station in the TTI bundling transmission manner, a maximum value of a quantity of resource blocks occupied by the terminal is F(i), where at least two F(i)s are not equal, $3 \leq F(i) \leq 100$, F(i) is an integer, $1 \leq i \leq 8$, and i is an integer.

In the terminal, the determining, by the processing unit, the TTI bundling transmission policy of the terminal according to the transmission attribute of the terminal includes:

when the transmission attribute of the terminal is a terminal category, when the terminal category is a machine-to-machine communication terminal, determining that when the terminal sends service data to the base station in the TTI bundling transmission manner, a maximum value of a quantity of resource blocks occupied by the terminal is where $1 \leq G \leq 3$, and G is an integer; or when the terminal category is not a machine-to-machine communication terminal, a maximum value of a quantity of resource blocks occupied by the terminal is H, where $3 < H \leq 100$, and H is an integer.

In the terminal, the determining, by the processing unit, the TTI bundling transmission policy of the terminal according to the transmission attribute of the terminal includes:

when the transmission attribute of the terminal is a terminal category, when the terminal category is equal to i, determining that when the terminal sends service data to the base station in the TTI bundling transmission manner, a maximum value of a size of a transport block occupied by the terminal is I(i), where at least two I(i)s are not equal, $16 \leq I(i) \leq 75376$, I(i) is an integer, $1 \leq i \leq 8$, and i is an integer.

In the terminal, the determining, by the processing unit, the TTI bundling transmission policy of the terminal according to the transmission attribute of the terminal includes:

when the transmission attribute of the terminal is a terminal category, when the terminal category is a machine-to-machine communication terminal, determining that when the terminal sends service data to the base station in the TTI bundling transmission manner, a maximum value of a size of a transport block occupied by the terminal is L(i), where $1 \leq L(i) \leq 1000$, and L(i) is an integer; or when the terminal category is not a machine-to-machine communication terminal, a maximum value of a size of a transport block occupied by the terminal is M(i), where $16 \leq M(i) \leq 75376$, and M(i) is an integer.

In the terminal, the determining, by the processing unit, the TTI bundling transmission policy of the terminal according to the transmission attribute of the terminal includes:

when the transmission attribute of the terminal is a terminal category, when the terminal category is equal to i, determining that when the terminal sends service data to the base station in the TTI bundling transmission manner, a quantity of TTIs in a TTI bundle occupied by the terminal is K(i), where at least two K(i)s are not equal, $1 \leq K(i) \leq 20$, K(i) is an integer, $1 \leq i \leq 8$, and i is an integer.

In the terminal, the determining, by the processing unit, the TTI bundling transmission policy of the terminal according to the transmission attribute of the terminal includes:

when the transmission attribute of the terminal is a TTI bundling capability supported by the terminal, determining, according to the TTI bundling capability supported by the terminal, a quantity of TTIs in a TTI bundle occupied by the terminal when the terminal sends service data to the base station in the TTI bundling transmission manner.

In the terminal, the determining, by the processing unit, the TTI bundling transmission policy of the terminal according to the transmission attribute of the terminal includes:

when the transmission attribute of the terminal is a terminal category, determining, according to the terminal category, a time length of an RTT in a TTI bundle occupied by the terminal when the terminal sends service data to the base station in the TTI bundling transmission manner.

In the terminal, the determining, by the processing unit, the TTI bundling transmission policy of the terminal according to the transmission attribute of the terminal includes:

when the transmission attribute of the terminal is a TTI bundling capability supported by the terminal, determining, according to the TTI bundling capability supported by the terminal, a time length of an RTT in a TTI bundle occupied by the terminal when the terminal sends service data to the base station in the TTI bundling transmission manner.

According to the foregoing technical solutions, in a TTI bundling transmission manner, a base station can flexibly allocate more time domain resources or frequency domain resources to a terminal according to a transmission attribute reported by the terminal, so that the terminal can provide a low-data rate service, a medium-data rate service, and a high-data rate service, making full use of an advantage of enlarged coverage brought by the TTI bundling transmission manner, enlarging coverage of medium-data rate and high-data rate services, improving a service capability and service quality of the terminal, and avoiding increasing complexity of the terminal while enlarging service coverage.

BRIEF DESCRIPTION OF DRAWINGS

To describe the technical solutions in the embodiments of the present disclosure more clearly, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

To make the technical solutions in the present disclosure more comprehensible, the following describes the embodiments of the present disclosure in detail with reference to the accompanying drawings.

It should be clear that the described embodiments are merely some but not all of the embodiments of the present disclosure. All other embodiments obtained by a person of ordinary skill in the art based on the embodiments of the present disclosure without creative efforts shall fall within the protection scope of the present disclosure.

Figure 1:
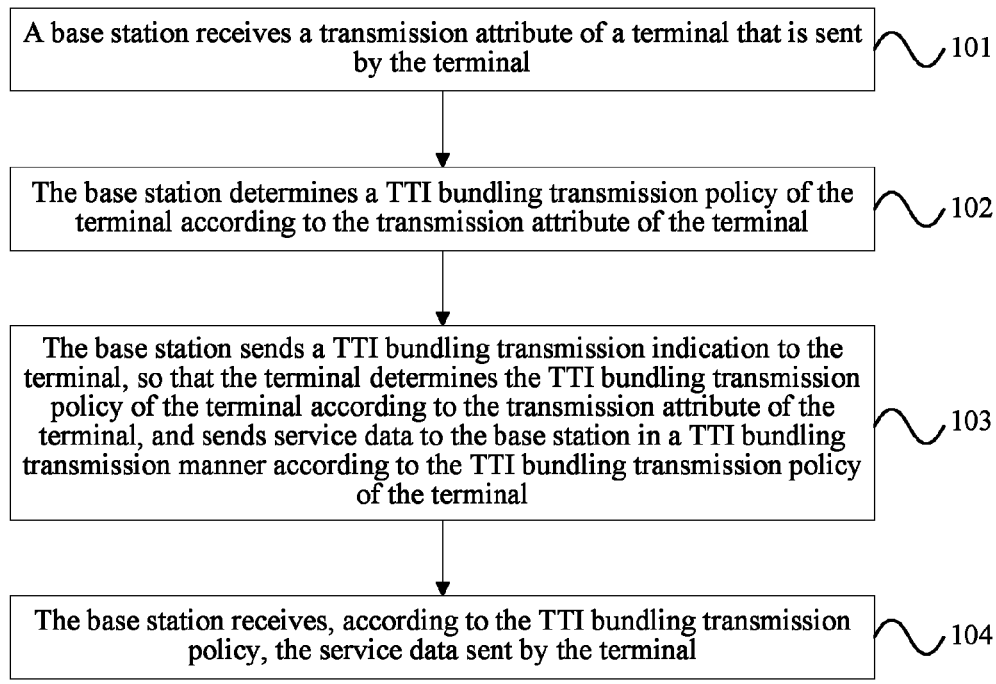
FIG. 1 is a schematic flowchart of a first method for transmitting service data according to an embodiment of the present disclosure.

An embodiment of the present disclosure gives a method for transmitting service data. Refer to FIG. 1, which is a schematic flowchart of a first method for transmitting service data according to an embodiment of the present disclosure. As shown in FIG. 1, the method includes the following steps:

Step 101: A base station receives a transmission attribute of a terminal that is sent by the terminal.

Step 102: The base station determines a TTI bundling transmission policy of the terminal according to the transmission attribute of the terminal.

Step 103: The base station sends a TTI bundling transmission indication to the terminal, so that the terminal determines the TTI bundling transmission policy of the terminal according to the transmission attribute of the terminal, and sends service data to the base station in a TTI bundling transmission manner according to the TTI bundling transmission policy of the terminal.

Step 104: The base station receives, according to the TTI bundling transmission policy, the service data sent by the terminal.

In the method, the transmission attribute of the terminal may include: whether the terminal supports a TTI bundle extended transmission manner, a terminal category (UE category), or a TTI bundling capability supported by the terminal.

The TTI bundle extended transmission manner may include: a transmission manner of TTI bundling of a release 12, a transmission manner in which more resource blocks can be used in a TTI bundle (that is, a quantity of resource blocks occupied by the terminal can be greater than 3), or the like.

The TTI bundling capability supported by the terminal may include at least one of the following: support for a larger quantity of TTIs, support for a smaller time length of an RTT, support for interleaving of TTIs, support for a dynamic quantity of TTIs, support for a dynamic time length of an RTT, and the like. A time length of an RTT refers to a time interval between two transmissions of service data.

In the method, the TTI bundling transmission policy of the terminal may include at least one of the following policies: a maximum value of a quantity of resource blocks, a maximum value of a size of a transport block, a quantity of TTIs in a TTI bundle, and a time length of an RTT in a TTI bundle.

A resource block refers to a unit of a resource that is occupied by the terminal when the terminal performs data transmission with the base station, and the quantity of resource blocks refers to how many resource units are allocated to the terminal when the terminal performs data transmission with the base station. The size of the transport block refers to a size of the transport block, where when data is transmitted to a physical layer, the data is divided into multiple data blocks, each data block is a transport block, and a quantity of bits included in the transport block is a size of the transport block.

The maximum value of the quantity of resource blocks is used for indicating that a quantity of resource blocks occupied by the terminal needs to be less than or equal to the maximum value of the quantity of resource blocks; similarly, the maximum value of the size of the transport block is used for indicating that a size of a transport block occupied by the terminal needs to be less than or is equal to the maximum value of the size of the transport block.

The method may be applied to an LTE system or an LTE-A system, where the base station may be an evolved NodeB (eNB), and the terminal may be user equipment (UE).

Figure 2:
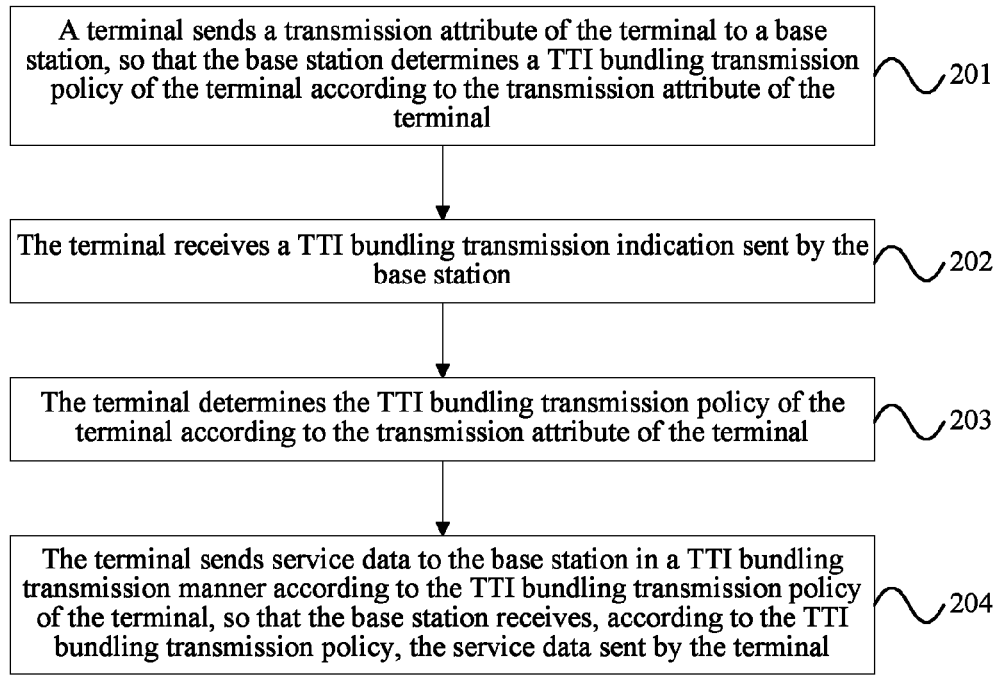
FIG. 2 is a schematic flowchart of a second method for transmitting service data according to an embodiment of the present disclosure.

An embodiment of the present disclosure gives a method for transmitting service data. Refer to FIG. 2, which is a schematic flowchart of a second method for transmitting service data according to an embodiment of the present disclosure. As shown in FIG. 2, the method includes the following steps:

Step 201: A terminal sends a transmission attribute of the terminal to a base station, so that the base station determines a TTI bundling transmission policy of the terminal according to the transmission attribute of the terminal.

Step 202: The terminal receives a TTI bundling transmission indication sent by the base station.

Step 203: The terminal determines the TTI bundling transmission policy of the terminal according to the transmission attribute of the terminal.

Step 204: The terminal sends service data to the base station in a TTI bundling transmission manner according to the TTI bundling transmission policy of the terminal, so that the base station receives, according to the TTI bundling transmission policy, the service data sent by the terminal.

In the method, the transmission attribute of the terminal may include: whether the terminal supports a TTI bundle extended transmission manner, a terminal category (UE category), or a TTI bundling capability supported by the terminal.

The TTI bundle extended transmission manner may include: a transmission manner of TTI bundling of a release 12, a transmission manner in which more resource blocks can be used in a TTI bundle (that is, a quantity of resource blocks occupied by the terminal can be greater than 3), or the like.

The TTI bundling capability supported by the terminal may include at least one of the following: support for a larger quantity of TTIs, support for a smaller time length of an RTT, support for interleaving of TTIs, support for a dynamic quantity of TTIs, support for a dynamic time length of an RTT, and the like. A time length of an RTT refers to a time interval between two transmissions of service data.

In the method, the TTI bundling transmission policy of the terminal may include at least one of the following policies: a maximum value of a quantity of resource blocks, a maximum value of a size of a transport block, a quantity of TTIs in a TTI bundle, and a time length of an RTT in a TTI bundle.

The maximum value of the quantity of resource blocks is used for indicating that a quantity of resource blocks occupied by the terminal needs to be less than or equal to the maximum value of the quantity of resource blocks; similarly, the maximum value of the size of the transport block is used for indicating that a size of a transport block occupied by the terminal needs to be less than or is equal to the maximum value of the size of the transport block.

The method may be applied to an LTE system or an LTE-A system, where the base station may be an evolved NodeB (eNB), and the terminal may be user equipment (UE).

In the method, the determining, by the terminal, the TTI bundling transmission policy of the terminal according to the transmission attribute of the terminal includes:

when the transmission attribute of the terminal is that the terminal supports a TTI bundle extended transmission manner, determining, by the terminal, that when the terminal sends service data to the base station in the TTI bundling transmission manner, a maximum value of a quantity of resource blocks occupied by the terminal is A, where $3<A\le100$, and A is an integer; or when the transmission attribute of the terminal is that the terminal supports a TTI bundle extended transmission manner, determining, by the terminal, that when the terminal sends service data to the base station in the TTI bundling transmission manner, a maximum value of a quantity of resource blocks occupied by the terminal is B and a maximum value of a size of a transport block occupied by the terminal is C, where $3<B\le100$, $16\le C\le75376$, and B and C are integers; or when the transmission attribute of the terminal is a terminal category, when the terminal category is equal to 0, 1, or 9, determining, by the terminal, that when the terminal sends service data to the base station in the TTI bundling transmission manner, a maximum value of a quantity of resource blocks occupied by the terminal is D, or when the terminal category is equal to 5, 6, 7, or 8, determining, by the terminal, that when the terminal sends service data to the base station in the TTI bundling transmission manner, a maximum value of a quantity of resource blocks occupied by the terminal is E, where $3\le D\le100$, $3\le E\le100$, D is not equal to E, and D and E are integers; or when the transmission attribute of the terminal is a terminal category, when the terminal category is equal to i, determining, by the terminal, that when the terminal sends service data to the base station in the TTI bundling transmission manner, a maximum value of a quantity of resource blocks occupied by the terminal is F(i), where at least two F(i)s are not equal, $3\le F(i)\le100$, F(i) is an integer, $1\le i\le 8$, and i is an integer; or when the transmission attribute of the terminal is a terminal category, when the terminal category is a machine-to-machine communication terminal, determining, by the terminal, that when the terminal sends service data to the base station in the TTI bundling transmission manner, a maximum value of a quantity of resource blocks occupied by the terminal is where $1\le G\le 3$, and G is an integer; or when the terminal category is not a machine-to-machine communication terminal, a maximum value of a quantity of resource blocks occupied by the terminal is H, where $3<H\le100$, and H is an integer; or when the transmission attribute of the terminal is a terminal category, when the terminal category is equal to i, determining, by the terminal, that when the terminal sends service data to the base station in the TTI bundling transmission manner, a maximum value of a size of a transport block occupied by the terminal is I(i), where at least two I(i)s are not equal, $16\le I(i)\le75376$, I(i) is an integer, $1\le i\le 8$, and i is an integer; or when the transmission attribute of the terminal is a terminal category, when the terminal category is a machine-to-machine communication terminal, determining, by the terminal, that when the terminal sends service data to the base station in the TTI bundling transmission manner, a maximum value of a size of a transport block of the terminal is L(i), where $1\le L(i)\le 1000$, and L(i) is an integer; or when the terminal category is not a machine-to-machine communication terminal, a maximum value of a size of a transport block of the terminal is M(i), where $16\le M(i)\le 75376$, and M(i) is an integer; or when the transmission attribute of the terminal is a terminal category, when the terminal category is equal to i, determining, by the terminal, that when the terminal sends service data to the base station in the TTI bundling transmission manner, a quantity of TTIs in a TTI bundle occupied by the terminal is K(i), where at least two K(i)s are not equal, $1\le K(i)\le 20$, K(i) is an integer, $1\le i\le 8$, and i is an integer; or when the transmission attribute of the terminal is a TTI bundling capability supported by the terminal, determining, by the terminal according to the TTI bundling capability supported by the terminal, a quantity of TTIs in a TTI bundle occupied by the terminal when the terminal sends service data to the base station in the TTI bundling transmission manner; or when the transmission attribute of the terminal is a terminal category, determining, by the terminal according to the terminal category, a time length of an RTT in a TTI bundle occupied by the terminal when the terminal sends service data to the base station in the TTI bundling transmission manner; or when the transmission attribute of the terminal is a TTI bundling capability supported by the terminal, determining, by the terminal according to the TTI bundling capability supported by the terminal, a time length of an RTT in a TTI bundle occupied by the terminal when the terminal sends service data to the base station in the TTI bundling transmission manner.

It should be noted that the terminal category may include 0 to 9, and may further be a machine-to-machine communication terminal. When the terminal category is a machine-to-machine communication terminal, the terminal category may be 0 or 9, or when the terminal category is not a machine-to-machine communication terminal, the terminal category may be 1 to 8. When the terminal category may be 1 to 8, the terminal category indicates a level of an access capability of the terminal, that is, a level of a transmission rate that can be supported by the terminal. When the terminal category is 1, it indicates that the terminal has a downlink rate of 10.293 Mbps and an uplink rate of 5.16 Mbps; when the terminal category is 2, it indicates that the terminal has a downlink rate of 51.024 Mbps and an uplink rate of 25.456 Mbps; when the terminal category is 3, it indicates that the terminal has a downlink rate of 102.048 Mbps and an uplink rate of 51.024 Mbps; when the terminal category is 4, it indicates that the terminal has a downlink rate of 150.752 Mbps and an uplink rate of 51.024 Mbps; when the terminal category is 5, it indicates that the terminal has a downlink rate of 299.552 Mbps and an uplink rate of 75.376 Mbps; when the terminal category is 6, it indicates that the terminal has a downlink rate of 301.504 Mbps and an uplink rate of 51.024 Mbps; when the terminal category is 7, it indicates that the terminal has a downlink rate of 301.504 Mbps and an uplink rate of 102.048 Mbps; and when the terminal category is 8, it indicates that the terminal has a downlink rate of 2998.56 Mbps and an uplink rate of 1497.76 Mbps.

In this embodiment of the present disclosure, the base station and the terminal are required to separately determine a TTI bundling transmission policy of the terminal according to the transmission attribute of the terminal. Therefore, to ensure consistency of TTI bundling transmission policies determined by the base station and the terminal, an identifier may be added to the TTI bundling transmission indication sent by the base station to the terminal, where the identifier is used for indicating a method by using which the base station determines the TTI bundling transmission policy according to the transmission attribute; or a stipulation may be made in a protocol in advance, for example, a method of determining the TTI bundling transmission policy according to the transmission attribute may be configured for the base station and the terminal, where the method may be any one of the foregoing methods by using which the terminal determines the TTI bundling transmission policy of the terminal according to the transmission attribute of the terminal, as long as methods configured on the terminal and the base station are the same, or it may be stipulated that the base station and the terminal separately determine the TTI bundling transmission policy of the terminal in a same order by using one of the foregoing methods.

Embodiment 1

Figure 3:
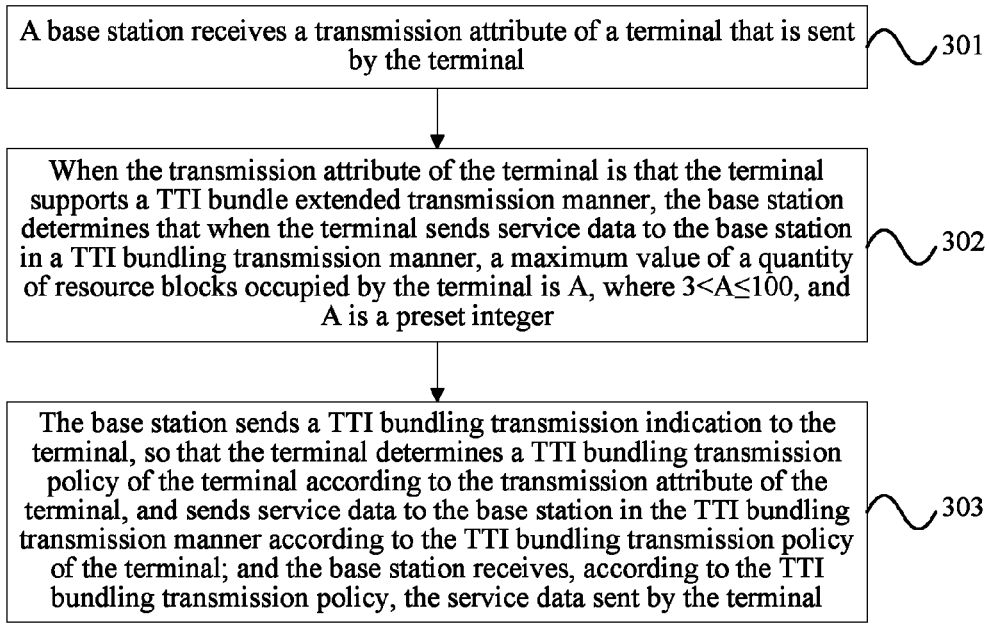
FIG. 3 is a schematic flowchart of Embodiment 1 of a method for transmitting service data according to the embodiments of the present disclosure.

Refer to FIG. 3, which is a schematic flowchart of Embodiment 1 of a method for transmitting service data according to the embodiments of the present disclosure. In an LTE system or an LTE-A system, in a case in which a base station configures a TTI bundle extended transmission manner of an R12 for a terminal, a TTI bundling transmission behavior of the terminal complies with a limitation from the TTI bundle extended transmission manner of the R12I In this embodiment, the base station limits a maximum value of a quantity of resource blocks occupied by the terminal. As shown in the figure, the method includes the following steps:

Step 301: A base station receives a transmission attribute of a terminal that is sent by the terminal.

Step 302: When the transmission attribute of the terminal is that the terminal supports a TTI bundle extended transmission manner, the base station determines that when the terminal sends service data to the base station in a TTI bundling transmission manner, a maximum value of a quantity of resource blocks occupied by the terminal is A, where $3<A\leq100$, and A is a preset integer. For example, 10 resource blocks or 20 resource blocks are used.

Preferably, the TTI bundle extended transmission manner supported by the terminal may include a maximum value A of a quantity of resource blocks that can be supported by the terminal, so that the base station determines, according to the TTI bundle extended transmission manner supported by the terminal, the maximum value A of the quantity of resource blocks that can be supported by the terminal.

It should be noted that, when the terminal supports the TTI bundle extended transmission manner, the terminal still uses a quadrature phase shift keying (QPSK) modulation scheme.

Step 303: The base station sends a TTI bundling transmission indication to the terminal, so that the terminal determines a TTI bundling transmission policy of the terminal according to the transmission attribute of the terminal, and sends service data to the base station in the TTI bundling transmission manner according to the TTI bundling transmission policy of the terminal; and the base station receives, according to the TTI bundling transmission policy, the service data sent by the terminal.

For example, if 10 resource blocks are used, corresponding transport blocks may be determined according to the 10 resource blocks. As shown in Table 1, numerals in a horizontal direction in Table 1 indicates resource blocks numbered 1 to 10, numerals in a vertical direction in Table 1 indicates transport blocks numbered 1 to 26, and one resource block corresponds to a size of 26 transport blocks. The base station may determine that in Table 1, transport blocks corresponding to resource blocks whose quantity is less than or equal to 10 are resource blocks that can be occupied by the terminal when the terminal sends service data to the base station in the TTI bundling transmission manner, and the base station receives, according to sizes of the transport blocks, the service data sent by the terminal. In this embodiment of the present disclosure, the service data sent by the terminal may include at least one of the following types of service data: low-data rate service data, medium-data rate service data, and high-data rate service data.

TABLE 1

| Transport block | Resource block | | | | | | | | | |
|---|---|---|---|---|---|---|---|---|---|---|
| | 1 | 2 | 3 | 4 | 5 | 6 | 7 | 8 | 9 | 10 |
| 0 | 16 | 32 | 56 | 88 | 120 | 152 | 176 | 208 | 224 | 256 |
| 1 | 24 | 56 | 88 | 144 | 176 | 208 | 224 | 256 | 328 | 344 |
| 2 | 32 | 72 | 144 | 176 | 208 | 256 | 296 | 328 | 376 | 424 |

TABLE 1-continued

| Transport block | Resource block | | | | | | | | | |
|---|---|---|---|---|---|---|---|---|---|---|
| | 1 | 2 | 3 | 4 | 5 | 6 | 7 | 8 | 9 | 10 |
| 3 | 40 | 104 | 176 | 208 | 256 | 328 | 392 | 440 | 504 | 568 |
| 4 | 56 | 120 | 208 | 256 | 328 | 408 | 488 | 552 | 632 | 696 |
| 5 | 72 | 144 | 224 | 328 | 424 | 504 | 600 | 680 | 776 | 872 |
| 6 | 328 | 176 | 256 | 392 | 504 | 600 | 712 | 808 | 936 | 1032 |
| 7 | 104 | 224 | 328 | 472 | 584 | 712 | 840 | 968 | 1096 | 1224 |
| 8 | 120 | 256 | 392 | 536 | 680 | 808 | 968 | 1096 | 1256 | 1384 |
| 9 | 136 | 296 | 456 | 616 | 776 | 936 | 1096 | 1256 | 1416 | 1544 |
| 10 | 144 | 328 | 504 | 680 | 872 | 1032 | 1224 | 1384 | 1544 | 1736 |
| 11 | 176 | 376 | 584 | 776 | 1000 | 1192 | 1384 | 1608 | 1800 | 2024 |
| 12 | 208 | 440 | 680 | 904 | 1128 | 1352 | 1608 | 1800 | 2024 | 2280 |
| 13 | 224 | 488 | 744 | 1000 | 1256 | 1544 | 1800 | 2024 | 2280 | 2536 |
| 14 | 256 | 552 | 840 | 1128 | 1416 | 1736 | 1992 | 2280 | 2600 | 2856 |
| 15 | 280 | 600 | 904 | 1224 | 1544 | 1800 | 2152 | 2472 | 2728 | 3112 |
| 16 | 328 | 632 | 968 | 1288 | 1608 | 1928 | 2280 | 2600 | 2984 | 3240 |
| 17 | 336 | 696 | 1064 | 1416 | 1800 | 2152 | 2536 | 2856 | 3240 | 3624 |
| 18 | 376 | 776 | 1160 | 1544 | 1992 | 2344 | 2792 | 3112 | 3624 | 4008 |
| 19 | 408 | 840 | 1288 | 1736 | 2152 | 2600 | 2984 | 3496 | 3880 | 4264 |
| 20 | 440 | 904 | 1384 | 1864 | 2344 | 2792 | 3240 | 3752 | 4136 | 4584 |
| 21 | 488 | 1000 | 1480 | 1992 | 2472 | 2984 | 3496 | 4008 | 4584 | 4968 |
| 22 | 520 | 1064 | 1608 | 2152 | 2664 | 3240 | 3752 | 4264 | 4776 | 5352 |
| 23 | 552 | 1128 | 1736 | 2280 | 2856 | 3496 | 4008 | 4584 | 5160 | 5736 |
| 24 | 584 | 1192 | 1800 | 2408 | 2984 | 3624 | 4264 | 4968 | 5544 | 5992 |
| 25 | 616 | 1256 | 1864 | 2536 | 3112 | 3752 | 4392 | 5160 | 5736 | 6200 |
| 26 | 712 | 1480 | 2216 | 2984 | 3752 | 4392 | 5160 | 5992 | 6712 | 7480 |

In this embodiment, properly limiting the maximum value of the quantity of resource blocks occupied by the terminal in the TTI bundle extended transmission manner is limiting a quantity of resource blocks allocated by the base station to the terminal, which can reduce complexity of terminal implementation. Because the maximum value of the quantity of resource blocks occupied by the terminal in the TTI bundle extended transmission manner is greater than a maximum value of a quantity of resource blocks occupied by the terminal in existing TTI bundling transmission, a data throughput of the terminal can be greatly increased, coverage of medium-data rate and high-data rate services can be enlarged, and a service capability and service quality of the terminal can be improved, thereby improving user experience.

Embodiment 2

Figure 4:
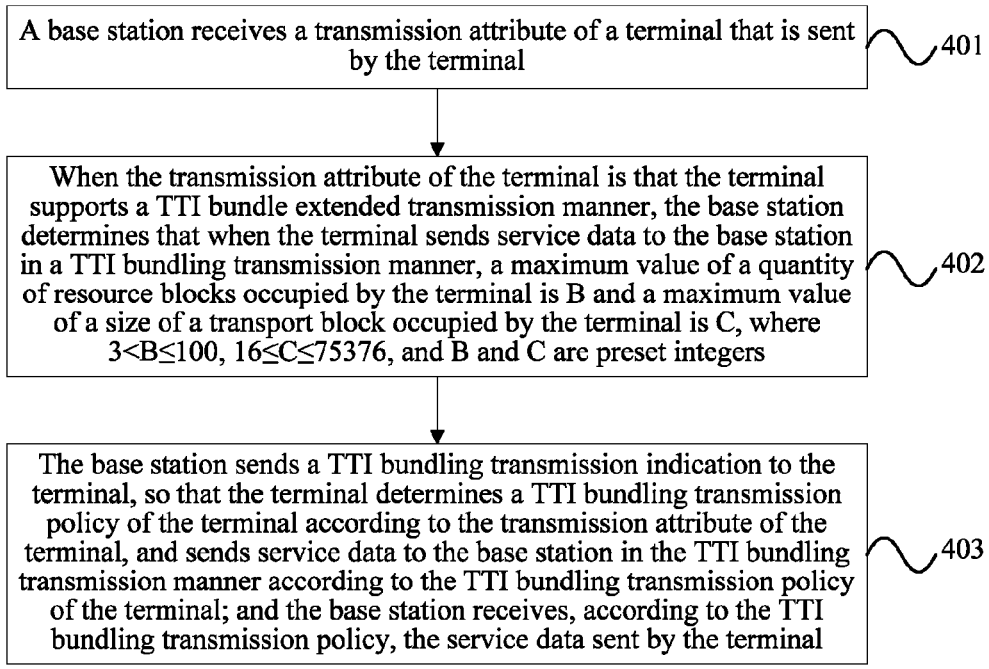
FIG. 4 is a schematic flowchart of Embodiment 2 of a method for transmitting service data according to the embodiments of the present disclosure.

Refer to FIG. 4, which is a schematic flowchart of Embodiment 2 of a method for transmitting service data according to the embodiments of the present disclosure. In an LTE system or an LTE-A system, in a case in which a base station configures a TTI bundle extended transmission manner of an R12 for a terminal, a TTI bundling transmission behavior of the terminal complies with a limitation from the TTI bundle extended transmission manner of the R12. In this embodiment, the base station limits a maximum value of a quantity of resource blocks occupied by the terminal and limits a maximum value of a size of a transport block occupied by the terminal. As shown in the figure, the method includes the following steps:

Step 401: A base station receives a transmission attribute of a terminal that is sent by the terminal.

Step 402: When the transmission attribute of the terminal is that the terminal supports a TTI bundle extended transmission manner, the base station determines that when the terminal sends service data to the base station in a TTI bundling transmission manner, a maximum value of a quantity of resource blocks occupied by the terminal is B and a maximum value of a size of a transport block occupied by the terminal is C, where $3<B\leq100$, $16\leq C\leq75376$, and B and C are preset integers. A unit of the size of the transport block is bit.

For example, if the maximum value of the size of the transport block is that the size of the transport block is less than or equal to 3752, a size of each transport block in a transport block set is less than or equal to 3752; or if the size of the transport block is less than or equal to 7480, a size of each transport block in a transport block set is less than or equal to 7480.

Step 403: The base station sends a TTI bundling transmission indication to the terminal, so that the terminal determines a TTI bundling transmission policy of the terminal according to the transmission attribute of the terminal, and sends service data to the base station in the TTI bundling transmission manner according to the TTI bundling transmission policy of the terminal; and the base station receives, according to the TTI bundling transmission policy, the service data sent by the terminal.

For example, the size of the transport block is less than or equal to 3752, and the quantity of resource blocks is less than or equal to 10. As shown in Table 2, numerals in a horizontal direction in Table 2 indicates resource blocks numbered 1 to 10, numerals in a vertical direction in Table 2 indicates transport blocks numbered 1 to 26, and one resource block corresponds to a size of 26 transport blocks. The base station may determine that in Table 2, transport blocks corresponding to resource blocks whose quantity is less than or equal to 10 are resource blocks that can be occupied by the terminal when the terminal sends service data to the base station in the TTI bundling transmission manner, and the base station receives, according to size s of the determined transport blocks and the quantity of resource blocks, the service data sent by the terminal. In this embodiment of the present disclosure, the service data sent by the terminal includes at least one of the following types of data: low-data rate service data, medium-data rate service data, and high-data rate service data.

For example, as shown in Table 2, if a size of a transport block corresponding to a resource block must be less than or equal to 3752, a transport block whose size is greater than 3752 cannot be allocated to the terminal for use.

TABLE 2

| Transport block | Resource block | | | | | | | | | |
|---|---|---|---|---|---|---|---|---|---|---|
| | 1 | 2 | 3 | 4 | 5 | 6 | 7 | 8 | 9 | 10 |
| 0 | 16 | 32 | 56 | 88 | 120 | 152 | 176 | 208 | 224 | 256 |
| 1 | 24 | 56 | 88 | 144 | 176 | 208 | 224 | 256 | 328 | 344 |
| 2 | 32 | 72 | 144 | 176 | 208 | 256 | 296 | 328 | 376 | 424 |
| 3 | 40 | 104 | 176 | 208 | 256 | 328 | 392 | 440 | 504 | 568 |
| 4 | 56 | 120 | 208 | 256 | 328 | 408 | 488 | 552 | 632 | 696 |
| 5 | 72 | 144 | 224 | 328 | 424 | 504 | 600 | 680 | 776 | 872 |
| 6 | 328 | 176 | 256 | 392 | 504 | 600 | 712 | 808 | 936 | 1032 |
| 7 | 104 | 224 | 328 | 472 | 584 | 712 | 840 | 968 | 1096 | 1224 |
| 8 | 120 | 256 | 392 | 536 | 680 | 808 | 968 | 1096 | 1256 | 1384 |
| 9 | 136 | 296 | 456 | 616 | 776 | 936 | 1096 | 1256 | 1416 | 1544 |
| 10 | 144 | 328 | 504 | 680 | 872 | 1032 | 1224 | 1384 | 1544 | 1736 |
| 11 | 176 | 376 | 584 | 776 | 1000 | 1192 | 1384 | 1608 | 1800 | 2024 |
| 12 | 208 | 440 | 680 | 904 | 1128 | 1352 | 1608 | 1800 | 2024 | 2280 |
| 13 | 224 | 488 | 744 | 1000 | 1256 | 1544 | 1800 | 2024 | 2280 | 2536 |
| 14 | 256 | 552 | 840 | 1128 | 1416 | 1736 | 1992 | 2280 | 2600 | 2856 |
| 15 | 280 | 600 | 904 | 1224 | 1544 | 1800 | 2152 | 2472 | 2728 | 3112 |
| 16 | 328 | 632 | 968 | 1288 | 1608 | 1928 | 2280 | 2600 | 2984 | 3240 |
| 17 | 336 | 696 | 1064 | 1416 | 1800 | 2152 | 2536 | 2856 | 3240 | 3624 |
| 18 | 376 | 776 | 1160 | 1544 | 1992 | 2344 | 2792 | 3112 | 3624 | — |
| 19 | 408 | 840 | 1288 | 1736 | 2152 | 2600 | 2984 | 3496 | — | — |
| 20 | 440 | 904 | 1384 | 1864 | 2344 | 2792 | 3240 | 3752 | — | — |
| 21 | 488 | 1000 | 1480 | 1992 | 2472 | 2984 | 3496 | — | — | — |
| 22 | 520 | 1064 | 1608 | 2152 | 2664 | 3240 | 3752 | — | — | — |
| 23 | 552 | 1128 | 1736 | 2280 | 2856 | 3496 | — | — | — | — |
| 24 | 584 | 1192 | 1800 | 2408 | 2984 | 3624 | — | — | — | — |
| 25 | 616 | 1256 | 1864 | 2536 | 3112 | 3752 | — | — | — | — |
| 26 | 712 | 1480 | 2216 | 2984 | 3752 | — | — | — | — | — |

In this embodiment, properly limiting the maximum value of the quantity of resource blocks occupied by the terminal in the TTI bundle extended transmission manner and limiting the maximum value of the size of the transport block occupied by the terminal further reduces complexity of terminal implementation on the basis of Embodiment 1. Because the maximum value of the quantity of resource blocks occupied by the terminal in the TTI bundle extended transmission manner is greater than a maximum value of a quantity of resource blocks occupied by the terminal in existing TTI bundling transmission, a data throughput of the terminal can be greatly increased, coverage of medium-data rate and high-data rate services can be enlarged, and a service capability and service quality of the terminal can be improved, thereby improving user experience.

Embodiment 3

Figure 5:
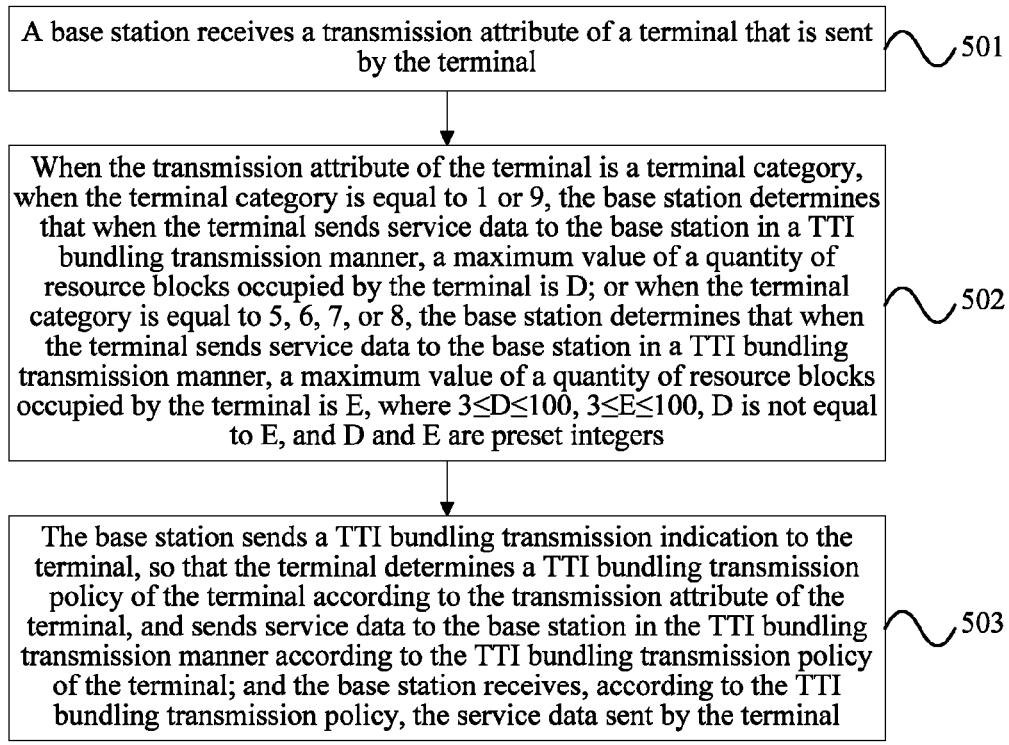
FIG. 5 is a schematic flowchart of Embodiment 3 of a method for transmitting service data according to the embodiments of the present disclosure.

Refer to FIG. 5, which is a schematic flowchart of Embodiment 3 of a method for transmitting service data according to the embodiments of the present disclosure. In an LTE system or an LTE-A system, in a case in which a base station configures a TTI bundling transmission manner of an R12 for a terminal, a TTI bundling transmission behavior of the terminal complies with a limitation from the TTI bundling transmission manner of the R12. In this embodiment, the base station determines, according to a terminal category, a maximum value of a quantity of resource blocks occupied by the terminal. As shown in the figure, the method includes the following steps:

Step 501: A base station receives a transmission attribute of a terminal that is sent by the terminal.

Step 502: When the transmission attribute of the terminal is a terminal category, when the terminal category is equal to 0, 1, or 9, the base station determines that when the terminal sends service data to the base station in a TTI bundling transmission manner, a maximum value of a quantity of resource blocks occupied by the terminal is D; or when the terminal category is equal to 5, 6, 7, or 8, the base station determines that when the terminal sends service data to the base station in a TTI bundling transmission manner, a maximum value of a quantity of resource blocks occupied by the terminal is E, where 3≤D≤100, 3≤E≤100, D is not equal to E, and D and E are preset integers.

For example, when the terminal category is 1, the maximum value of the quantity of resource blocks may be 6, 10, or 20; and when the terminal category is 5, 6, 7, or 8, the maximum value of the quantity of resource blocks may be 50 or 100. For terminals whose terminal categories are not 1 and whose terminal categories are different, maximum values of quantities of resource blocks may be the same or different.

For example, when the terminal category is 9, the maximum value of the quantity of resource blocks may be 3 or 6; and when the terminal category is 5, 6, 7, or 8, the maximum value of the quantity of resource blocks may be 6, 10, or 20. For terminals whose terminal categories are not 9 and whose terminal categories are different, maximum values of quantities of resource blocks may be the same or different.

Step 503: The base station sends a TTI bundling transmission indication to the terminal, so that the terminal determines a TTI bundling transmission policy of the terminal according to the transmission attribute of the terminal, and sends service data to the base station in the TTI bundling transmission manner according to the TTI bundling transmission policy of the terminal; and the base station receives, according to the TTI bundling transmission policy, the service data sent by the terminal.

In this embodiment, properly limiting, according to different terminal categories, maximum values of quantities of different resource blocks occupied by terminals in a TTI bundle extended transmission manner can implement categorized processing on terminals of different categories, where when a terminal category is relatively low, it indicates that a processing capability of a terminal is relatively poor, and then a maximum value of a quantity of occupied resource blocks may be limited to be relatively small; and when a terminal category is relatively high, it indicates that a processing capability of a terminal is relatively strong, and then a maximum value of a quantity of occupied resource blocks may be limited to be relatively large. In this way, data throughputs of the terminals can be further increased, ensuring user experience of different terminal categories.

Embodiment 4

Figure 6:
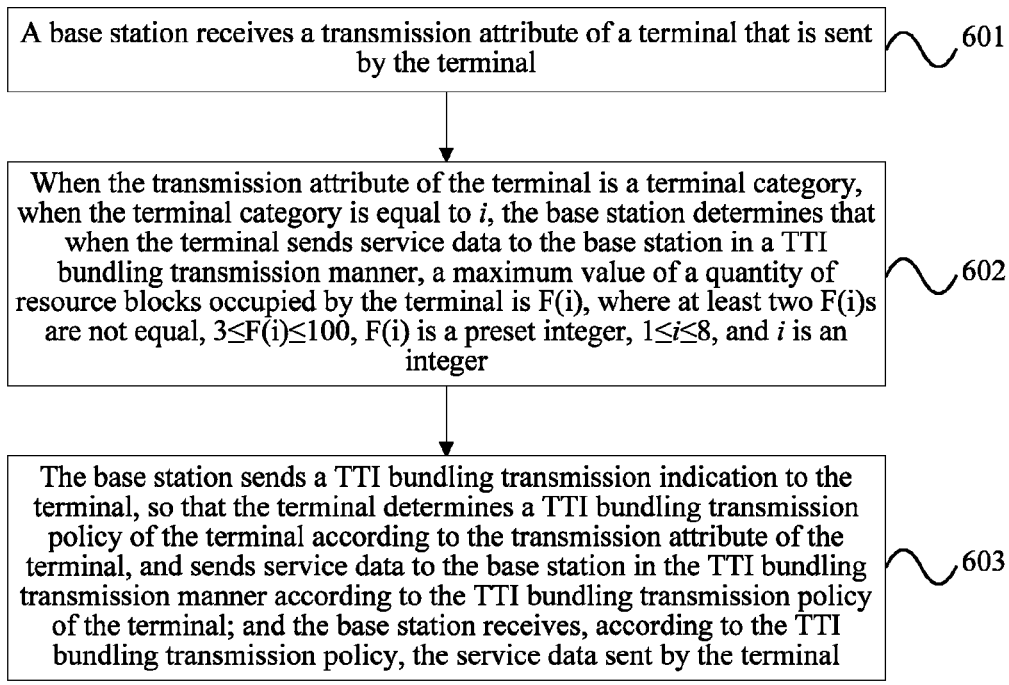
FIG. 6 is a schematic flowchart of Embodiment 4 of a method for transmitting service data according to the embodiments of the present disclosure.

Refer to FIG. 6, which is a schematic flowchart of Embodiment 4 of a method for transmitting service data according to the embodiments of the present disclosure. In an LTE system or an LTE-A system, in a case in which a base station configures a TTI bundling transmission manner of an R12 for a terminal, a TTI bundling transmission behavior of the terminal complies with a limitation from the TTI bundling transmission manner of the R12. In this embodiment, the base station determines, according to an attribute of the terminal, a maximum value of a quantity of resource blocks occupied by the terminal. As shown in the figure, the method includes the following steps:

Step 601: A base station receives a transmission attribute of a terminal that is sent by the terminal.

Step 602: When the transmission attribute of the terminal is a terminal category, when the terminal category is equal to i, the base station determines that when the terminal sends service data to the base station in a TTI bundling transmission manner, a maximum value of a quantity of resource blocks occupied by the terminal is $F(i)$, where at least two $F(i)$s are not equal, $3 \le F(i) \le 100$, $F(i)$ is a preset integer, $1 \le i \le 8$, and i is an integer.

As shown in Table 3, the base station determines, according to a terminal category, a maximum value of a quantity of resource blocks that can be occupied by the terminal:

TABLE 3

| Terminal category | Maximum value of quantity of resource blocks |
| --- | --- |
| 1 | 10 |
| 2 | 100 |
| 3 | 100 |
| 4 | 100 |
| 5 | 100 |
| 6 | 100 |
| 7 | 100 |
| 8 | 100 |

Step 603: The base station sends a TTI bundling transmission indication to the terminal, so that the terminal determines a TTI bundling transmission policy of the terminal according to the transmission attribute of the terminal, and sends service data to the base station in the TTI bundling transmission manner according to the TTI bundling transmission policy of the terminal; and the base station receives, according to the TTI bundling transmission policy, the service data sent by the terminal.

In this embodiment, properly limiting, according to different terminal categories, maximum values of quantities of different resource blocks occupied by terminals in a TTI bundle extended transmission manner can implement categorized processing on terminals of different categories, where when a terminal category is relatively low, it indicates that a processing capability of a terminal is relatively poor, and then a maximum value of a quantity of occupied resource blocks may be limited to be relatively small; and when a terminal category is relatively high, it indicates that a processing capability of a terminal is relatively strong, and then a maximum value of a quantity of occupied resource blocks may be limited to be relatively large. In this way, data throughputs of the terminals can be further increased, ensuring user experience of different terminal categories.

Embodiment 5

Figure 7:
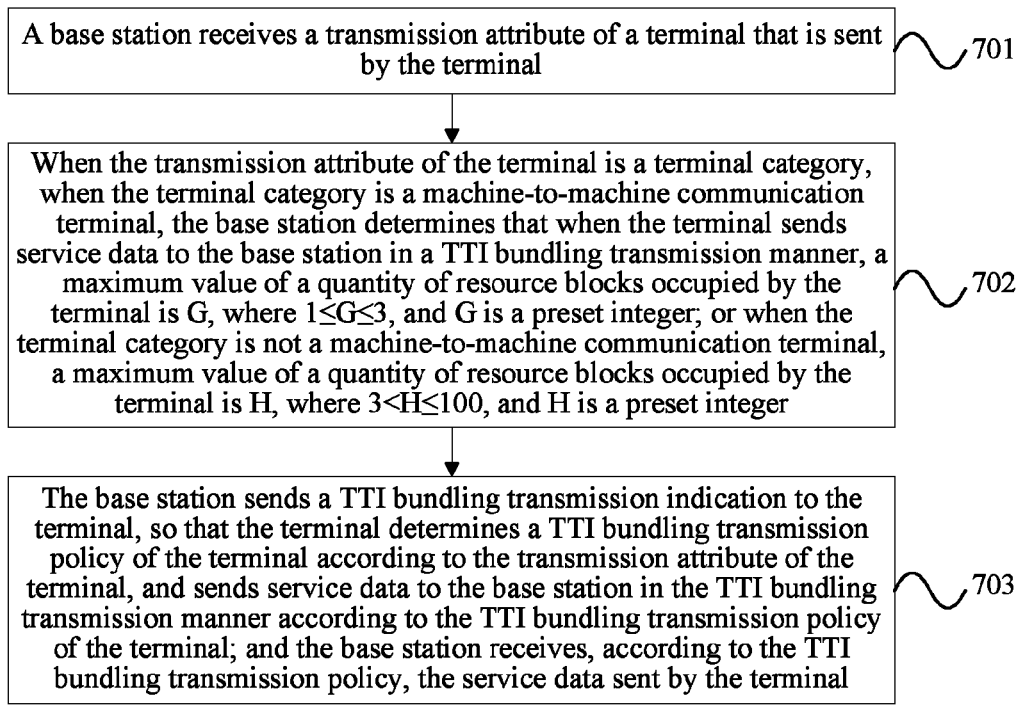
FIG. 7 is a schematic flowchart of Embodiment 5 of a method for transmitting service data according to the embodiments of the present disclosure.

Refer to FIG. 7, which is a schematic flowchart of Embodiment 5 of a method for transmitting service data according to the embodiments of the present disclosure. In an LTE system or an LTE-A system, in a case in which a base station configures a TTI bundling transmission manner of an R12 for a terminal, a TTI bundling transmission behavior of the terminal complies with a limitation from the TTI bundling transmission manner of the R12. In this embodiment, the base station determines, according to a terminal category, a maximum value of a quantity of resource blocks occupied by the terminal. As shown in the figure, the method includes the following steps:

Step 701: A base station receives a transmission attribute of a terminal that is sent by the terminal.

Step 702: When the transmission attribute of the terminal is a terminal category, when the terminal category is a machine-to-machine communication terminal, the base station determines that when the terminal sends service data to the base station in a TTI bundling transmission manner, a maximum value of a quantity of resource blocks occupied by the terminal is where $1 \le G \le 3$, and G is a preset integer; or when the terminal category is not a machine-to-machine communication terminal, a maximum value of a quantity of resource blocks occupied by the terminal is H, where $3 < H \le 100$, and H is a preset integer.

For example, when the terminal category is a machine-to-machine communication terminal, the maximum value of the quantity of resource blocks may be 3 or 6; and when the terminal category is not a machine-to-machine communication terminal, the maximum value of the quantity of resource blocks may be 6, 10, or 20. For terminals whose terminal categories are not machine-to-machine communication terminals, maximum values of quantities of resource blocks may be the same or different.

Step 703: The base station sends a TTI bundling transmission indication to the terminal, so that the terminal determines a TTI bundling transmission policy of the terminal according to the transmission attribute of the terminal, and sends service data to the base station in the TTI bundling transmission manner according to the TTI bundling transmission policy of the terminal; and the base station receives, according to the TTI bundling transmission policy, the service data sent by the terminal.

In this embodiment, properly limiting, according to different terminal categories, maximum values of quantities of different resource blocks occupied by terminals in a TTI bundle extended transmission manner can implement categorized processing on terminals of different categories, and herein, a maximum value of a quantity of occupied resource blocks is limited to be relatively small for a machine-to-machine communication terminal, which can further reduce complexity of the machine-to-machine communication terminal, thereby reducing costs of the machine-to-machine communication terminal and further promoting the machine-to-machine communication terminal.

Embodiment 6

Figure 8:
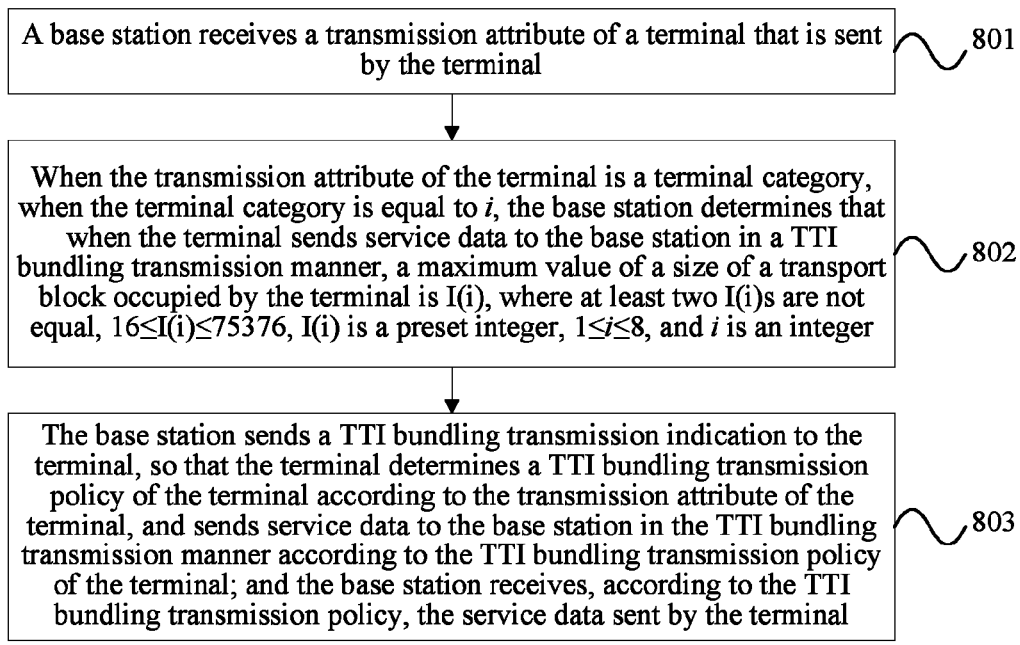
FIG. 8 is a schematic flowchart of Embodiment 6 of a method for transmitting service data according to the embodiments of the present disclosure.

Refer to FIG. 8, which is a schematic flowchart of Embodiment 6 of a method for transmitting service data according to the embodiments of the present disclosure. In an LTE system or an LTE-A system, in a case in which a base station configures a TTI bundling transmission manner of an R12 for a terminal, a TTI bundling transmission behavior of the terminal complies with a limitation from the TTI bundling transmission manner of the R12. In this embodiment, the base station determines, according to a terminal category, a maximum value of a size of a transport block occupied by the terminal. As shown in the figure, the method includes the following steps:

Step 801: A base station receives a transmission attribute of a terminal that is sent by the terminal.

Step 802: When the transmission attribute of the terminal is a terminal category, when the terminal category is equal to i, the base station determines that when the terminal sends service data to the base station in a TTI bundling transmission manner, a maximum value of a size of a transport block occupied by the terminal is I(i), where at least two I(i)s are not equal, $16 \leq I(i) \leq 75376$, I(i) is a preset integer, $1 \leq i \leq 8$, and i is an integer.

As shown in Table 4, the base station determines, according to a terminal category, a maximum value of a size of a transport block occupied by the terminal:

TABLE 4

| Terminal category | Maximum value of size of transport block |
|---|---|
| 1 | 2216 |
| 2 | 7480 |
| 3 | 7480 |
| 4 | 7480 |
| 5 | 7480 |
| 6 | 7480 |
| 7 | 7480 |
| 8 | 7480 |

Step 803: The base station sends a TTI bundling transmission indication to the terminal, so that the terminal determines a TTI bundling transmission policy of the terminal according to the transmission attribute of the terminal, and sends service data to the base station in the TTI bundling transmission manner according to the TTI bundling transmission policy of the terminal; and the base station receives, according to the TTI bundling transmission policy, the service data sent by the terminal.

In this embodiment, maximum values of size s of different transport blocks are limited according to different terminal categories, which can further reduce complexity of the different terminal categories, thereby reducing terminal costs.

Embodiment 7

Figure 9:
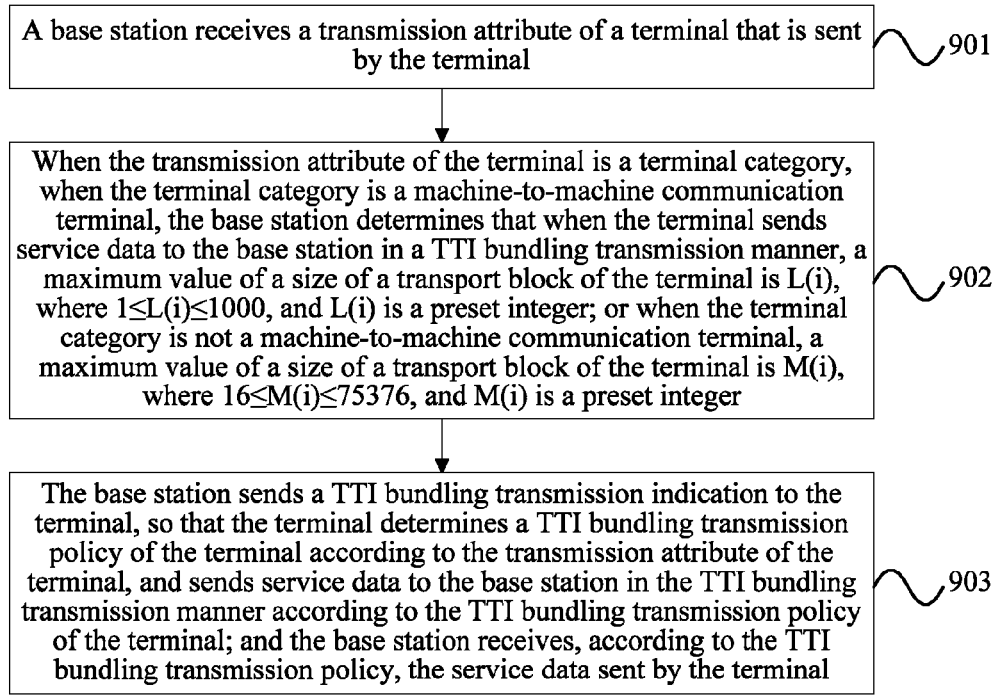
FIG. 9 is a schematic flowchart of Embodiment 7 of a method for transmitting service data according to the embodiments of the present disclosure.

Refer to FIG. 9, which is a schematic flowchart of Embodiment 7 of a method for transmitting a data packet according to the embodiments of the present disclosure. In an LTE system or an LTE-A system, in a case in which a base station configures a TTI bundling transmission manner of an R12 for a terminal, a TTI bundling transmission behavior of the terminal complies with a limitation from the TTI bundling transmission manner of the R12. In this embodiment, the base station determines, according to a terminal category, a maximum value of a size of a transport block occupied by the terminal. As shown in the figure, the method includes the following steps:

Step 901: A base station receives a transmission attribute of a terminal that is sent by the terminal.

Step 902: When the transmission attribute of the terminal is a terminal category, when the terminal category is a machine-to-machine communication terminal, the base station determines that when the terminal sends service data to the base station in a TTI bundling transmission manner, a maximum value of a size of a transport block of the terminal is L(i), where $1 \leq L(i) \leq 1000$, and L(i) is a preset integer; or when the terminal category is not a machine-to-machine communication terminal, a maximum value of a size of a transport block of the terminal is M(i), where $16 \leq M(i) \leq 75376$, and M(i) is a preset integer.

For example, when the terminal category is a machine-to-machine communication terminal, the maximum value of the size of the transport block may be 2216 or 4392; and when the terminal category is not a machine-to-machine communication terminal, the maximum value of the size of the transport block may be 7480 or 11064. For terminals whose terminal categories are not machine-to-machine communication terminals and whose terminal categories are different, maximum values of size s of transport blocks may be the same or different.

Step 903: The base station sends a TTI bundling transmission indication to the terminal, so that the terminal determines a TTI bundling transmission policy of the terminal according to the transmission attribute of the terminal, and sends service data to the base station in the TTI bundling transmission manner according to the TTI bundling transmission policy of the terminal; and the base station receives, according to the TTI bundling transmission policy, the service data sent by the terminal.

It should be noted that, in the foregoing Embodiment 3 to Embodiment 7, a base station may determine, according to a terminal category, a quantity of resource blocks occupied by a terminal or a size of a transport block occupied by the terminal, and may receive, according to the determined quantity of resource blocks or the determined size of the transport block, service data sent by the terminal, so that the base station can flexibly determine a quantity of resource blocks or a size of a transport block to the terminal, and in a case in which load of an entire system is relatively small, in a TTI bundling transmission manner, the base station can allocate more transmission resources to the terminal, so that the terminal can support a medium-data rate service and a high-data rate service, thereby enlarging coverage of the medium-data rate service and the high-data rate service, and improving a service capability and service quality of the terminal.

In this embodiment, maximum values of size s of different transport blocks are limited according to different terminal categories, which can further reduce complexity of the different terminal categories, thereby reducing terminal costs.

Embodiment 8

Figure 10:
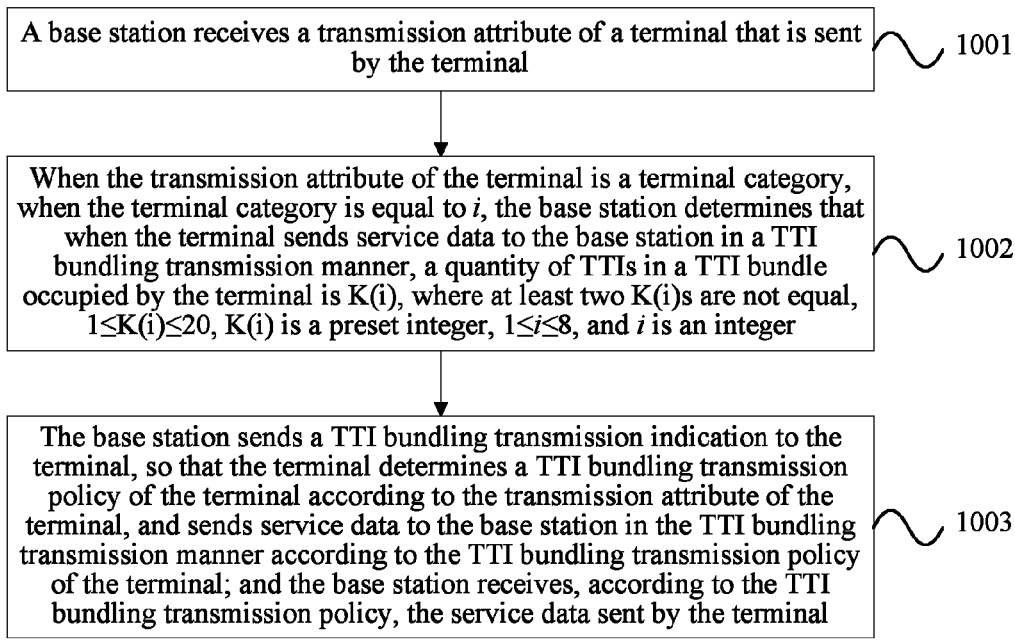
FIG. 10 is a schematic flowchart of Embodiment 8 of a method for transmitting service data according to the embodiments of the present disclosure.

Refer to FIG. 10, which is a schematic flowchart of Embodiment 8 of a method for transmitting service data according to the embodiments of the present disclosure. In an LTE system or an LTE-A system, in a case in which a base station configures a TTI bundling transmission manner of an R12 for a terminal, a TTI bundling transmission behavior of the terminal complies with a limitation from the TTI bundling transmission manner of the R12. In this embodiment, the base station determines, according to a terminal category, a quantity of TTIs in a TTI bundle occupied by the terminal. As shown in the figure, the method includes the following steps:

Step 1001: A base station receives a transmission attribute of a terminal that is sent by the terminal.

Step 1002: When the transmission attribute of the terminal is a terminal category, when the terminal category is equal to i, the base station determines that when the terminal sends service data to the base station in a TTI bundling transmission manner, a quantity of TTIs in a TTI bundle occupied by the terminal is K(i), where at least two K(i)s are not equal, $1 \leq K(i) \leq 20$, K(i) is a preset integer, $1 \leq i \leq 8$, and i is an integer.

For example, as shown in Table 5, the base station determines, according to the terminal category, the quantity of TTIs in the TTI bundle in the TTI bundling transmission manner supported by the terminal:

TABLE 5

| Terminal category | Quantity of TTIs in TTI bundle |
| --- | --- |
| 1 | 4 |
| 2 | 10 |
| 3 | 10 |
| 4 | 10 |
| 5 | 10 |
| 6 | 10 |
| 7 | 10 |
| 8 | 10 |

Step 1003: The base station sends a TTI bundling transmission indication to the terminal, so that the terminal determines a TTI bundling transmission policy of the terminal according to the transmission attribute of the terminal, and sends service data to the base station in the TTI bundling transmission manner according to the TTI bundling transmission policy of the terminal; and the base station receives, according to the TTI bundling transmission policy, the service data sent by the terminal.

In this embodiment, the quantity of TTIs in the TTI bundle is relatively small, and therefore a requirement on a processing capability of the terminal is relatively low. Quantities of TTIs in different TTI bundles are limited according to different terminal categories, which can lower requirements on processing capabilities of the different terminal categories, and further reduce costs of the different terminal categories.

Embodiment 9

Figure 11:
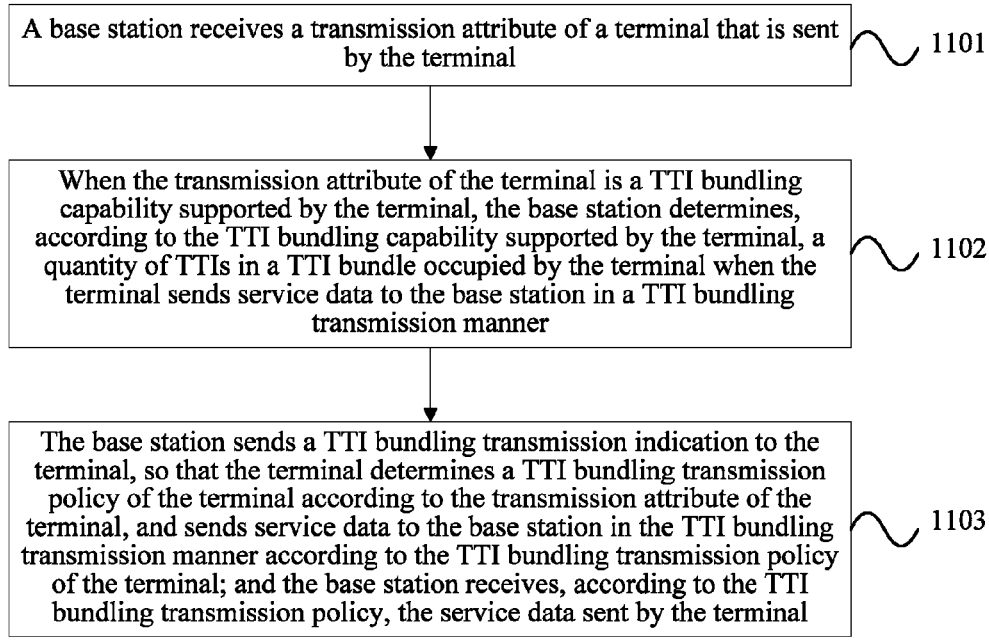
FIG. 11 is a schematic flowchart of Embodiment 9 of a method for transmitting service data according to the embodiments of the present disclosure.

Refer to FIG. 11, which is a schematic flowchart of Embodiment 9 of a method for transmitting service data according to the embodiments of the present disclosure. In an LTE system or an LTE-A system, in a case in which a base station configures a TTI bundling transmission manner of an R12 for a terminal, a TTI bundling transmission behavior of the terminal complies with a limitation from the TTI bundling transmission manner of the R12. In this embodiment, the base station determines, according to a TTI bundling capability supported by the terminal, a quantity of TTIs in a TTI bundle occupied by the terminal. As shown in the figure, the method includes the following steps:

Step 1101: A base station receives a transmission attribute of a terminal that is sent by the terminal.

Step 1102: When the transmission attribute of the terminal is a TTI bundling capability supported by the terminal, the base station determines, according to the TTI bundling capability supported by the terminal, a quantity of TTIs in a TTI bundle occupied by the terminal when the terminal sends service data to the base station in a TTI bundling transmission manner.

For example, if the TTI bundling capability supported by the terminal and reported by the terminal to the base station is supporting that a quantity of TTIs in a TTI bundle is 4, the base station determines that when the terminal sends service data to the base station in the TTI bundling transmission manner, a quantity of TTIs in a TTI bundle occupied by the terminal is 4; and if the TTI bundling capability supported by the terminal and reported by the terminal to the base station is supporting that a quantity of TTIs in a TTI bundle is 10, the base station determines that when the terminal sends service data to the base station in the TTI bundling transmission manner, a quantity of TTIs in a TTI bundle occupied by the terminal is 10, so as to implement that the base station receives, according to the TTI bundling capability supported by the terminal and reported by the terminal, the service data sent by the terminal.

Step 1103: The base station sends a TTI bundling transmission indication to the terminal, so that the terminal determines a TTI bundling transmission policy of the terminal according to the transmission attribute of the terminal, and sends service data to the base station in the TTI bundling transmission manner according to the TTI bundling transmission policy of the terminal; and the base station receives, according to the TTI bundling transmission policy, the service data sent by the terminal.

In this embodiment, the quantity of TTIs in the TTI bundle is small, and therefore a requirement on a processing capability of the terminal is low. Quantities of TTIs in different TTI bundles are limited for different terminal categories, which can lower requirements on processing capabilities of the different terminal categories, and further reduce costs of the different terminal categories.

Embodiment 10

Figure 12:
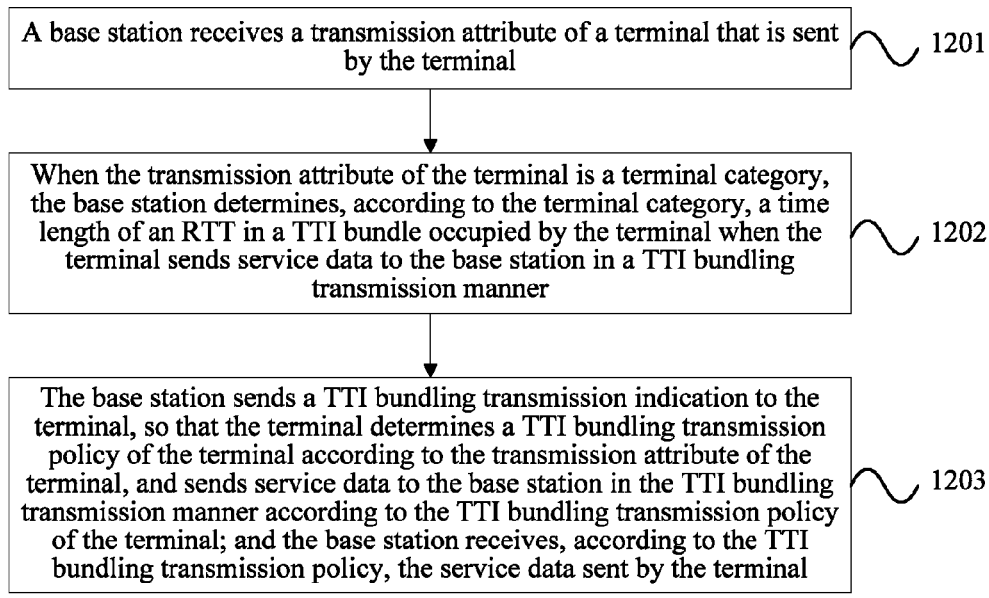
FIG. 12 is a schematic flowchart of Embodiment 10 of a method for transmitting service data according to the embodiments of the present disclosure.

Refer to FIG. 12, which is a schematic flowchart of Embodiment 10 of a method for transmitting service data according to the embodiments of the present disclosure. In an LTE system or an LTE-A system, in a case in which a base station configures a TTI bundling transmission manner of an R12 for a terminal, a TTI bundling transmission behavior of the terminal complies with a limitation from the TTI bundling transmission manner of the R12. In this embodiment, the base station determines, according to a terminal category, a time length of an RTT in a TTI bundle occupied by the terminal. As shown in the figure, the method includes the following steps:

Step 1201: A base station receives a transmission attribute of a terminal that is sent by the terminal.

Step 1202: When the transmission attribute of the terminal is a terminal category, the base station determines, according to the terminal category, a time length of an RTT in a TTI bundle occupied by the terminal when the terminal sends service data to the base station in a TTI bundling transmission manner.

For example, when the terminal category is equal to 1, the base station determines that when the terminal sends service data to the base station in the TTI bundling transmission manner, a time length of an RTT in a TTI bundle occupied by the terminal is equal to 16; and when the terminal category is not 1, the base station determines that when the terminal sends service data to the base station in the TTI bundling transmission manner, a time length of an RTT in a TTI bundle occupied by the terminal is equal to 12 or 8. For different terminals whose terminal categories are not 1 and whose terminal categories are different, time lengths of RTTs may be the same or different.

For example, as shown in Table 6, the base station determines, according to the terminal category, a time length of an RTT in a TTI bundle occupied by the terminal when the terminal sends service data to the base station in the TTI bundling transmission manner:

TABLE 6

| Terminal category | Time length of RTT |
|---|---|
| 1 | 16 |
| 2 | 12 |
| 3 | 12 |
| 4 | 12 |
| 5 | 12 |
| 6 | 12 |
| 7 | 12 |
| 8 | 12 |
| 9 | 16 |

Step 1203: The base station sends a TTI bundling transmission indication to the terminal, so that the terminal determines a TTI bundling transmission policy of the terminal according to the transmission attribute of the terminal, and sends service data to the base station in the TTI bundling transmission manner according to the TTI bundling transmission policy of the terminal; and the base station receives, according to the TTI bundling transmission policy, the service data sent by the terminal.

In this embodiment, the time length of the RTT in the TTI bundle is relatively long, and therefore a requirement on a processing capability of the terminal is relatively low. Time lengths of RTTs in different TTI bundles are limited according to different terminal categories, which can lower requirements on processing capabilities of the different terminal categories, and further reduce costs of the different terminal categories.

Embodiment 11

Figure 13:
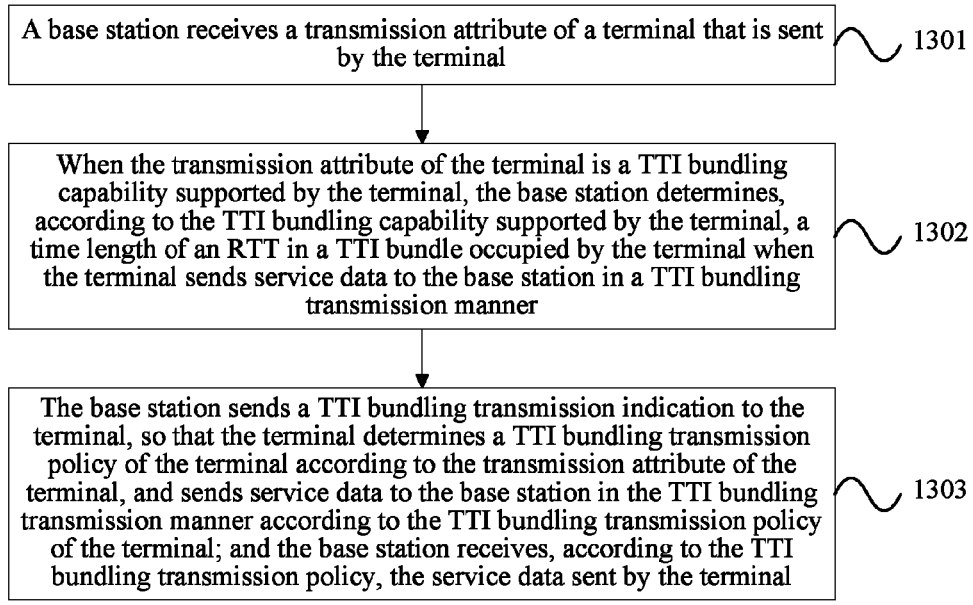
FIG. 13 is a schematic flowchart of Embodiment 11 of a method for transmitting service data according to the embodiments of the present disclosure.

Refer to FIG. 13, which is a schematic flowchart of Embodiment 11 of a method for transmitting service data according to the embodiments of the present disclosure. In an LTE system or an LTE-A system, in a case in which a base station configures a TTI bundling transmission manner of an R12 for a terminal, a TTI bundling transmission behavior of the terminal complies with a limitation from the TTI bundling transmission manner of the R12. In this embodiment, the base station determines, according to a TTI bundling capability supported by the terminal, a time length of an RTT in a TTI bundle occupied by the terminal. As shown in the figure, the method includes the following steps:

Step 1301: A base station receives a transmission attribute of a terminal that is sent by the terminal.

Step 1302: When the transmission attribute of the terminal is a TTI bundling capability supported by the terminal, the base station determines, according to the TTI bundling capability supported by the terminal, a time length of an RTT in a TTI bundle occupied by the terminal when the terminal sends service data to the base station in a TTI bundling transmission manner.

For example, if the TTI bundling capability supported by the terminal and reported by the terminal to the base station is that a time length of an RTT is equal to 16, the base station determines that when the terminal sends service data to the base station in the TTI bundling transmission manner, a time length of an RTT occupied by the terminal is equal to 16; and if the TTI bundling capability supported by the terminal and reported by the terminal to the base station is that a time length of an RTT is equal to 12, the base station determines that when the terminal sends service data to the base station in the TTI bundling transmission manner, a time length of an RTT occupied by the terminal is equal to 12, so as to implement that the base station determines, according to the TTI bundling capability supported by the terminal and reported by the terminal, the time length of the RTT occupied by the terminal when the terminal sends service data to the base station in the TTI bundling transmission manner, and receives, according to the time length of the RTT, the service data sent by the terminal.

Step 1303: The base station sends a TTI bundling transmission indication to the terminal, so that the terminal determines a TTI bundling transmission policy of the terminal according to the transmission attribute of the terminal, and sends service data to the base station in the TTI bundling transmission manner according to the TTI bundling transmission policy of the terminal; and the base station receives, according to the TTI bundling transmission policy, the service data sent by the terminal.

In this embodiment, the time length of the RTT in the TTI bundle is relatively long, and therefore a requirement on a processing capability of the terminal is relatively low. Time lengths of RTTs in different TTI bundles are limited according to transmission attributes reported by terminals, so that more possibilities are provided for terminal implementation, and the terminals may be designed and implemented according to requirements of terminal costs and user experience.

It should be noted that, in the foregoing Embodiment 8 to Embodiment 11, according to a terminal category or a TTI bundling capability supported by a terminal, a quantity of TTIs of the terminal in a TTI bundling transmission manner may be increased or a time length of an RTT of the terminal in the TTI bundling transmission manner may be decreased, which can enlarge coverage of services of various data rates, for example, coverage of a low-data rate service, a medium-data rate service, and a high-data rate service, thereby improving a service capability and service quality of the terminal.

Embodiment 12

Figure 14:
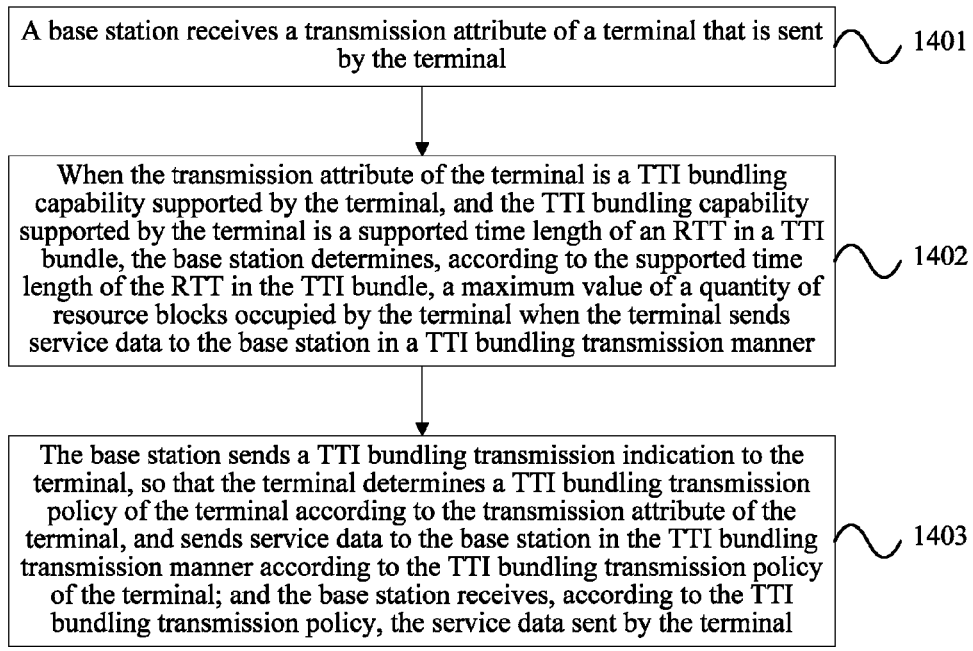
FIG. 14 is a schematic flowchart of Embodiment 12 of a method for transmitting service data according to the embodiments of the present disclosure.

Refer to FIG. 14, which is a schematic flowchart of Embodiment 12 of a method for transmitting service data according to the embodiments of the present disclosure. In an LTE system or an LTE-A system, in a case in which a base station configures a TTI bundling transmission manner of an R12 for a terminal, a TTI bundling transmission behavior of the terminal complies with a limitation from the TTI bundling transmission manner of the R12. In this embodiment, the base station determines, according to a TTI bundling capability supported by the terminal, a maximum value of a quantity of resource blocks occupied by the terminal. As shown in the figure, the method includes the following steps:

Step 1401: A base station receives a transmission attribute of a terminal that is sent by the terminal.

Step 1402: When the transmission attribute of the terminal is a TTI bundling capability supported by the terminal, and the TTI bundling capability supported by the terminal is a supported time length of an RTT in a TTI bundle, the base station determines, according to the supported time length of the RTT in the TTI bundle, a maximum value of a quantity of resource blocks occupied by the terminal when the terminal sends service data to the base station in a TTI bundling transmission manner.

For example, if the time length, supported by the terminal and reported by the terminal to the base station, of the RTT in the TTI bundle is 16, it is determined that when the terminal sends service data to the base station in the TTI bundling transmission manner, a maximum value of a quantity of resource blocks occupied by the terminal is 10 or 20; and if the time length, supported by the terminal and reported by the terminal to the base station, of the RTT in the TTI bundle is 12, it is determined that when the terminal sends service data to the base station in the TTI bundling transmission manner, a maximum value of a quantity of resource blocks occupied by the terminal is 3, so as to implement that the base station receives, according to the TTI bundling capability supported by the terminal and reported by the terminal, the service data sent by the terminal.

For example, as shown in Table 7, the base station determines, according to the TTI bundling capability supported by the terminal, the maximum value of the quantity of resource blocks in the TTI bundling transmission manner supported by the terminal:

TABLE 7

| Time length of RTT | Maximum value of quantity of resource blocks |
|---|---|
| 16 | 10 |
| 12 | 3 |

Step 1403: The base station sends a TTI bundling transmission indication to the terminal, so that the terminal determines a TTI bundling transmission policy of the terminal according to the transmission attribute of the terminal, and sends service data to the base station in the TTI bundling transmission manner according to the TTI bundling transmission policy of the terminal; and the base station receives, according to the TTI bundling transmission policy, the service data sent by the terminal.

In this embodiment, a relatively long time length of an RTT in a TTI bundle corresponds to a relatively large maximum value of a quantity of resource blocks occupied by the terminal, making terminal implementation more flexible.

The foregoing Embodiment 1 to Embodiment 12 correspond to the first method shown in FIG. 1, and are specific embodiments of determining a TTI bundling transmission policy of a terminal according to a transmission attribute of the terminal by a base station. For specific embodiments corresponding to the second method shown in FIG. 2, reference may be made to the specific embodiments of determining a TTI bundling transmission policy of a terminal according to a transmission attribute of the terminal by a base station, and details are not described herein again.

The embodiments of the present disclosure further give embodiments of apparatuses that implement the steps and methods in the foregoing method embodiments.

Figure 15:
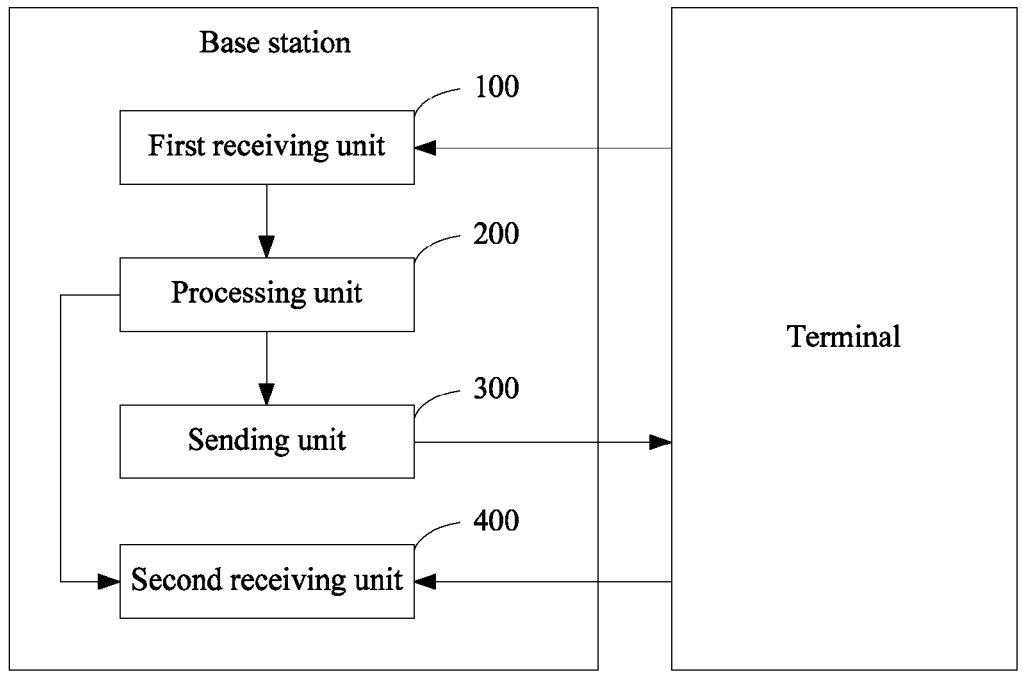
FIG. 15 is a functional block diagram of a base station according to an embodiment of the present disclosure.

Refer to FIG. 15, which is a functional block diagram of a base station according to an embodiment of the present disclosure. As shown in the figure, the base station includes:

a first receiving unit 100, configured to receive a transmission attribute of a terminal that is sent by the terminal;

a processing unit 200, configured to determine a TTI bundling transmission policy of the terminal according to the transmission attribute of the terminal;

a sending unit 300, configured to send a TTI bundling transmission indication to the terminal, so that the terminal determines the TTI bundling transmission policy of the terminal according to the transmission attribute of the terminal, and sends service data to the base station in a TTI bundling transmission manner according to the TTI bundling transmission policy of the terminal; and a second receiving unit 400, configured to receive, according to the TTI bundling transmission policy, the service data sent by the terminal.

The determining, by the processing unit 200, a TTI bundling transmission policy of the terminal according to the transmission attribute of the terminal includes:

when the transmission attribute of the terminal is that the terminal supports a TTI bundle extended transmission manner, determining that when the terminal sends service data to the base station in the TTI bundling transmission manner, a maximum value of a quantity of resource blocks occupied by the terminal is A, where $3<A\leq100$, and A is an integer.

The determining, by the processing unit 200, a TTI bundling transmission policy of the terminal according to the transmission attribute of the terminal includes:

when the transmission attribute of the terminal is that the terminal supports a TTI bundle extended transmission manner, determining that when the terminal sends service data to the base station in the TTI bundling transmission manner, a maximum value of a quantity of resource blocks occupied by the terminal is B and a maximum value of a size of a transport block occupied by the terminal is C, where $3<B\leq100$, $16\leq C\leq75376$, and B and C are integers.

The determining, by the processing unit 200, a TTI bundling transmission policy of the terminal according to the transmission attribute of the terminal includes:

when the transmission attribute of the terminal is a terminal category, when the terminal category is equal to 0, 1, or 9, determining that when the terminal sends service data to the base station in the TTI bundling transmission manner, a maximum value of a quantity of resource blocks occupied by the terminal is D; or when the terminal category is equal to 5, 6, 7, or 8, determining that when the terminal sends service data to the base station in the TTI bundling transmission manner, a maximum value of a quantity of resource blocks occupied by the terminal is E, where $3\leq D\leq100$, $3\leq E\leq100$, D is not equal to E, and D and E are integers.

The determining, by the processing unit 200, a TTI bundling transmission policy of the terminal according to the transmission attribute of the terminal includes:

when the transmission attribute of the terminal is a terminal category, when the terminal category is equal to i, determining that when the terminal sends service data to the base station in the TTI bundling transmission manner, a maximum value of a quantity of resource blocks occupied by the terminal is F(i), where at least two F(i)s are not equal, $3\leq F(i)\leq100$, F(i) is an integer, $1\leq i\leq8$, and i is an integer.

The determining, by the processing unit 200, a TTI bundling transmission policy of the terminal according to the transmission attribute of the terminal includes:

when the transmission attribute of the terminal is a terminal category, when the terminal category is a machine-to-machine communication terminal, determining that when the terminal sends service data to the base station in the TTI bundling transmission manner, a maximum value of a quantity of resource blocks occupied by the terminal is where $1 \leq G \leq 3$, and G is an integer; or when the terminal category is not a machine-to-machine communication terminal, a maximum value of a quantity of resource blocks occupied by the terminal is H, where $3 < H \leq 100$, and H is an integer.

The determining, by the processing unit 200, a TTI bundling transmission policy of the terminal according to the transmission attribute of the terminal includes:

when the transmission attribute of the terminal is a terminal category, when the terminal category is equal to i, determining that when the terminal sends service data to the base station in the TTI bundling transmission manner, a maximum value of a size of a transport block occupied by the terminal is I(i), where at least two I(i)s are not equal, $16 \leq I(i) \leq 75376$, I(i) is an integer, $1 \leq i \leq 8$, and i is an integer.

The determining, by the processing unit 200, a TTI bundling transmission policy of the terminal according to the transmission attribute of the terminal includes:

when the transmission attribute of the terminal is a terminal category, when the terminal category is a machine-to-machine communication terminal, determining that when the terminal sends service data to the base station in the TTI bundling transmission manner, a maximum value of a size of a transport block occupied by the terminal is L(i), where $1 \leq L(i) \leq 1000$, and L(i) is an integer; or when the terminal category is not a machine-to-machine communication terminal, a maximum value of a size of a transport block occupied by the terminal is M(i), where $16 \leq M(i) \leq 75376$, and M(i) is an integer.

The determining, by the processing unit 200, a TTI bundling transmission policy of the terminal according to the transmission attribute of the terminal includes:

when the transmission attribute of the terminal is a terminal category, when the terminal category is equal to i, determining that when the terminal sends service data to the base station in the TTI bundling transmission manner, a quantity of TTIs in a TTI bundle occupied by the terminal is K(i), where at least two K(i)s are not equal, $1 \leq K(i) \leq 20$, K(i) is an integer, $1 \leq i \leq 8$, and i is an integer.

The determining, by the processing unit 200, a TTI bundling transmission policy of the terminal according to the transmission attribute of the terminal includes:

when the transmission attribute of the terminal is a TTI bundling capability supported by the terminal, determining, according to the TTI bundling capability supported by the terminal, a quantity of TTIs in a TTI bundle occupied by the terminal when the terminal sends service data to the base station in the TTI bundling transmission manner.

The determining, by the processing unit 200, a TTI bundling transmission policy of the terminal according to the transmission attribute of the terminal includes:

when the transmission attribute of the terminal is a terminal category, determining, according to the terminal category, a time length of an RTT in the TTI bundle occupied by the terminal when the terminal sends the service data to the base station in the TTI bundling transmission manner.

The determining, by the processing unit 200, a TTI bundling transmission policy of the terminal according to the transmission attribute of the terminal includes:

when the transmission attribute of the terminal is a TTI bundling capability supported by the terminal, determining, according to the TTI bundling capability supported by the terminal, a time length of an RTT in the TTI bundle occupied by the terminal when the terminal sends the service data to the base station in the TTI bundling transmission manner.

Figure 16:
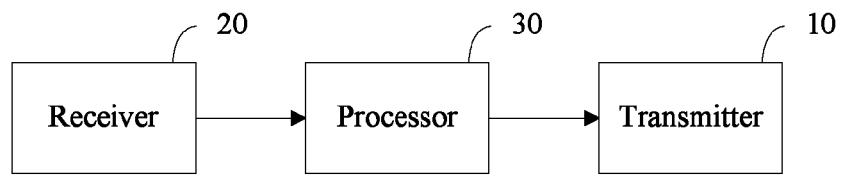
FIG. 16 is a schematic structural diagram of a base station according to an embodiment of the present disclosure.

Refer to FIG. 16, which is a schematic structural diagram of a base station according to an embodiment of the present disclosure. As shown in the figure, the base station includes: a transmitter 10, a receiver 20, and a processor 30 that is separately connected to the transmitter 10 and the receiver 20. Certainly, the base station may further include general components such as an antenna, a baseband processing component, an intermediate radio frequency processing component, and an input and output apparatus, which is not limited herein in this embodiment of the present disclosure.

The receiver 20 is configured to receive a transmission attribute of a terminal that is sent by the terminal;

the processor 30 is separately connected to the transmitter 10 and the receiver 20, and is configured to determine a TTI bundling transmission policy of the terminal according to the transmission attribute of the terminal;

the transmitter 10 is configured to send a TTI bundling transmission indication to the terminal, so that the terminal determines the TTI bundling transmission policy of the terminal according to the transmission attribute of the terminal, and sends service data to the base station in a TTI bundling transmission manner according to the TTI bundling transmission policy of the terminal; and the receiver 20 is further configured to receive, according to the TTI bundling transmission policy, the service data sent by the terminal.

Figure 17:
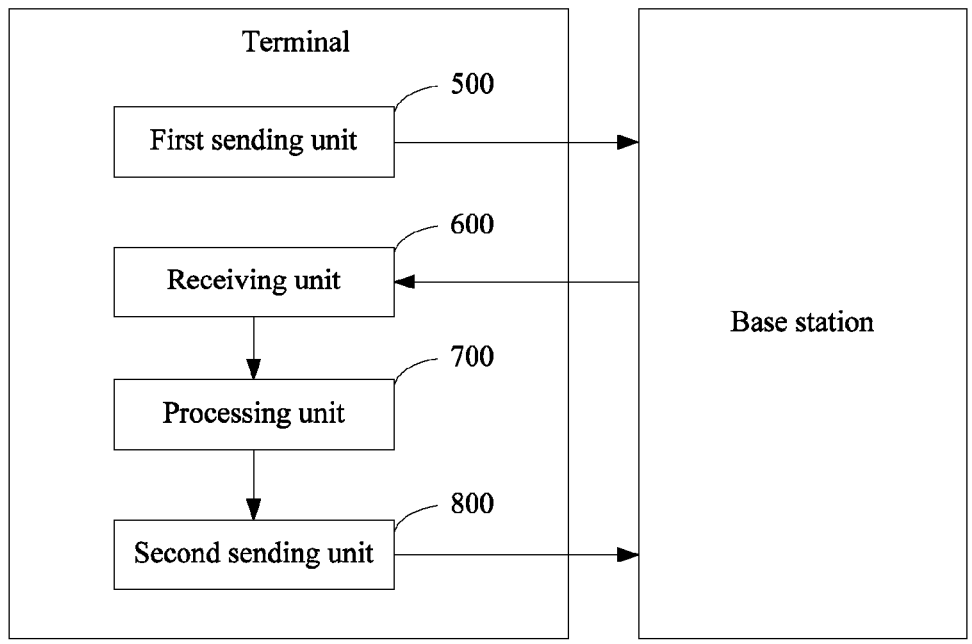
FIG. 17 is a functional block diagram of a terminal according to an embodiment of the present disclosure.

Refer to FIG. 17, which is a functional block diagram of a terminal according to an embodiment of the present disclosure. As shown in the figure, the terminal includes:

a first sending unit 500, configured to send a transmission attribute of the terminal to a base station, so that the base station determines a TTI bundling transmission policy of the terminal according to the transmission attribute of the terminal;

a receiving unit 600, configured to receive a TTI bundling transmission indication sent by the base station;

a processing unit 700, configured to determine the TTI bundling transmission policy of the terminal according to the transmission attribute of the terminal; and a second sending unit 800, configured to send service data to the base station in a TTI bundling transmission manner according to the TTI bundling transmission policy of the terminal, so that the base station receives, according to the TTI bundling transmission policy of the terminal, the service data sent by the terminal.

The determining, by the processing unit 700, the TTI bundling transmission policy of the terminal according to the transmission attribute of the terminal includes:

when the transmission attribute of the terminal is that the terminal supports a TTI bundle extended transmission manner, determining that when the terminal sends service data to the base station in the TTI bundling transmission manner, a maximum value of a quantity of resource blocks occupied by the terminal is A, where $3 < A \leq 100$, and A is an integer.

The determining, by the processing unit 700, the TTI bundling transmission policy of the terminal according to the transmission attribute of the terminal includes:

when the transmission attribute of the terminal is that the terminal supports a TTI bundle extended transmission manner, determining that when the terminal sends service data to the base station in the TTI bundling transmission manner, a maximum value of a quantity of resource blocks occupied by the terminal is B and a maximum value of a size of a transport block occupied by the terminal is C, where $3 < B \leq 100$, $16 \leq C \leq 75376$, and B and C are integers.

The determining, by the processing unit 700, the TTI bundling transmission policy of the terminal according to the transmission attribute of the terminal includes:

when the transmission attribute of the terminal is a terminal category, when the terminal category is equal to 0, 1, or 9, determining that when the terminal sends service data to the base station in the TTI bundling transmission manner, a maximum value of a quantity of resource blocks occupied by the terminal is D; or when the terminal category is equal to 5, 6, 7, or 8, determining that when the terminal sends service data to the base station in the TTI bundling transmission manner, a maximum value of a quantity of resource blocks occupied by the terminal is E, where $3 \leq D \leq 100$, $3 \leq E \leq 100$, D is not equal to E, and D and E are integers.

The determining, by the processing unit 700, the TTI bundling transmission policy of the terminal according to the transmission attribute of the terminal includes:

when the transmission attribute of the terminal is a terminal category, when the terminal category is equal to i, determining that when the terminal sends service data to the base station in the TTI bundling transmission manner, a maximum value of a quantity of resource blocks occupied by the terminal is $F(i)$, where at least two $F(i)$s are not equal, $3 \leq F(i) \leq 100$, $F(i)$ is an integer, $1 \leq i \leq 8$, and i is an integer.

The determining, by the processing unit 700, the TTI bundling transmission policy of the terminal according to the transmission attribute of the terminal includes:

when the transmission attribute of the terminal is a terminal category, when the terminal category is a machine-to-machine communication terminal, determining that when the terminal sends service data to the base station in the TTI bundling transmission manner, a maximum value of a quantity of resource blocks occupied by the terminal is where $1 \leq G \leq 3$, and G is an integer; or when the terminal category is not a machine-to-machine communication terminal, a maximum value of a quantity of resource blocks occupied by the terminal is H, where $3 < H \leq 100$, and H is an integer.

The determining, by the processing unit 700, the TTI bundling transmission policy of the terminal according to the transmission attribute of the terminal includes:

when the transmission attribute of the terminal is a terminal category, when the terminal category is equal to i, determining that when the terminal sends service data to the base station in the TTI bundling transmission manner, a maximum value of a size of a transport block occupied by the terminal is $I(i)$, where at least two $I(i)$s are not equal, $16 \leq I(i) \leq 75376$, $I(i)$ is an integer, $1 \leq i \leq 8$, and i is an integer.

The determining, by the processing unit 700, the TTI bundling transmission policy of the terminal according to the transmission attribute of the terminal includes:

when the transmission attribute of the terminal is a terminal category, when the terminal category is a machine-to-machine communication terminal, determining that when the terminal sends service data to the base station in the TTI bundling transmission manner, a maximum value of a size of a transport block occupied by the terminal is $L(i)$, where $1 \leq L(i) \leq 1000$, and $L(i)$ is an integer; or when the terminal category is not a machine-to-machine communication terminal, a maximum value of a size of a transport block occupied by the terminal is $M(i)$, where $16 \leq M(i) \leq 75376$, and $M(i)$ is an integer.

The determining, by the processing unit 700, the TTI bundling transmission policy of the terminal according to the transmission attribute of the terminal includes:

when the transmission attribute of the terminal is a terminal category, when the terminal category is equal to i, determining that when the terminal sends service data to the base station in the TTI bundling transmission manner, a quantity of TTIs in a TTI bundle occupied by the terminal is $K(i)$, where at least two $K(i)$s are not equal, $1 \leq K(i) \leq 20$, $K(i)$ is an integer, $1 \leq i \leq 8$, and i is an integer.

The determining, by the processing unit 700, the TTI bundling transmission policy of the terminal according to the transmission attribute of the terminal includes:

when the transmission attribute of the terminal is a TTI bundling capability supported by the terminal, determining, according to the TTI bundling capability supported by the terminal, a quantity of TTIs in a TTI bundle occupied by the terminal when the terminal sends service data to the base station in the TTI bundling transmission manner.

The determining, by the processing unit 700, the TTI bundling transmission policy of the terminal according to the transmission attribute of the terminal includes:

when the transmission attribute of the terminal is a terminal category, determining, according to the terminal category, a time length of an RTT in the TTI bundle occupied by the terminal when the terminal sends the service data to the base station in the TTI bundling transmission manner.

The determining, by the processing unit 700, the TTI bundling transmission policy of the terminal according to the transmission attribute of the terminal includes:

when the transmission attribute of the terminal is a TTI bundling capability supported by the terminal, determining, according to the TTI bundling capability supported by the terminal, a time length of an RTT in the TTI bundle occupied by the terminal when the terminal sends the service data to the base station in the TTI bundling transmission manner.

Figure 18:
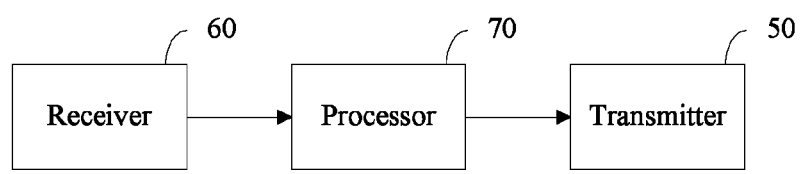
FIG. 18 is a schematic structural diagram of a terminal according to an embodiment of the present disclosure.

Refer to FIG. 18, which is a schematic structural diagram of a terminal according to an embodiment of the present disclosure. As shown in the figure, the terminal includes:

a transmitter 50, configured to send a transmission attribute of the terminal to a base station, so that the base station determines a TTI bundling transmission policy of the terminal according to the transmission attribute of the terminal;

a receiver 60, configured to receive a TTI bundling transmission indication sent by the base station; and a processor 70, separately connected to the receiver 60 and the transmitter 50, and configured to determine the TTI bundling transmission policy of the terminal according to the transmission attribute of the terminal, where the transmitter 50 is further configured to send service data to the base station in a TTI bundling transmission manner according to the TTI bundling transmission policy of the terminal, so that the base station receives, according to the TTI bundling transmission policy of the terminal, the service data sent by the terminal.

The foregoing descriptions are merely exemplary embodiments of the present disclosure, but are not intended to limit the present disclosure. Any modification, equivalent replacement, or improvement made without departing from the spirit and principle of the present disclosure should fall within the protection scope of the present disclosure.

What is claimed is:

1. A terminal comprises:
    a transmitter configured to send a transmission attribute of the terminal to a base station,
        wherein the transmission attribute indicates whether the terminal supports transmission by a transmission time interval (TTI) bundle extended transmission manner, a terminal category or a TTI bundling capability supported by the terminal and the transmission attribute is used to determine a TTI bundling transmission policy of the terminal, and wherein the TTI bundling transmission policy is at least one of (a) a maximum value of a quantity of resource blocks, (b) a maximum value of a size of a transport block, (c) a quantity of TTIs in a TTI bundle and (d) a time length of a round trip time (RTT) in a TTI bundle;

a receiver configured to receive a TTI bundling transmission indication from the base station;

a processor configured to determine a TTI bundling transmission policy of the terminal according to the transmission attribute of the terminal; and wherein the transmitter is further configured to send service data to the base station in a TTI bundling transmission manner according to the TTI bundling transmission policy of the terminal.

2. The terminal according to claim 1, wherein the processor determines the TTI bundling transmission policy by:
determining that a maximum value of a quantity of resource blocks for the terminal to send service data to the base station in a TTI bundling transmission manner is A, in a case that the transmission attribute of the terminal indicates that the terminal supports a TTI bundle extended transmission manner, wherein $3<A \leq 100$, and A is an integer.

3. The terminal according to claim 1, wherein the processor determines the TTI bundling transmission policy by:
determining that the maximum value of the quantity of resource blocks for the terminal to send service data to the base station in a TTI bundling transmission manner is F(i), in a case that the transmission attribute of the terminal indicates a terminal category and the terminal category is equal to i, wherein at least two F(i)s are not equal, $3 \leq F(i) \leq 100$, F(i) is an integer, $1 \leq i \leq 8$, and i is an integer.

4. The terminal according to claim 1, wherein the processor determines the TTI bundling transmission policy by:
determining that the maximum value of the size of the transport block for the terminal to send service data to the base station in a TTI bundling transmission manner is I(i), in a case that the transmission attribute of the terminal indicates a terminal category and the terminal category is equal to i, wherein at least two I(i)s are not equal, $16 \leq I(i) \leq 75376$, I(i) is an integer, $1 \leq i \leq 8$, and i is an integer.

5. The terminal according to claim 1, wherein the processor determines the TTI bundling transmission policy by:
determining that the maximum value of the size of the transport block for the terminal to send service data to the base station in a TTI bundling transmission manner is L(i), in a case that the transmission attribute of the terminal indicates a terminal category and the terminal category is a machine-to-machine communication terminal, wherein $1 \leq L(i) \leq 1000$, and L(i) is an integer.

6. The terminal according to claim 1, wherein the processor determines the TTI bundling transmission policy by:
determining that the maximum value of the size of the transport block for the terminal to send service data to the base station in a TTI bundling transmission manner is M(i), in a case that the transmission attribute of the terminal indicates a terminal category and the terminal category is not a machine-to-machine communication terminal, wherein $16 \leq M(i) \leq 75376$, and M(i) is an integer.

7. The terminal according to claim 1, wherein the processor determines the TTI bundling transmission policy by:
determining that the quantity of TTIs in the TTI bundle for the terminal is K(i), in the case that the transmission attribute of the terminal is a terminal category, and the terminal category is equal to i, wherein at least two K(i)s are not equal, $1 \leq K(i) \leq 20$, K(i) is an integer, $1 \leq i \leq 8$, and i is an integer.

8. The terminal according to claim 1, wherein the processor determines the TTI bundling transmission policy by:
determining the time length of the RTT in the TTI bundle for the terminal in the case that the transmission attribute of the terminal is a TTI bundling capability supported by the terminal.

9. A method for transmitting service data from a terminal to a base station wherein the method comprises:
sending, by the terminal, a transmission attribute to the base station,
wherein the transmission attribute indicates whether the terminal supports a transmission time interval (TTI) bundle extended transmission manner, a terminal category or a TTI bundling capability supported by the terminal and the transmission attribute is used to determine a TTI bundling transmission policy of the terminal, and
wherein the TTI bundling transmission policy is at least one of (a) a maximum value of a quantity of resource blocks, (b) a maximum value of a size of a transport block, (c) a quantity of TTIs in a TTI bundle and (d) a time length of a round trip time (RTT) in a TTI bundle;
receiving, by the terminal, a TTI bundling transmission indication from the base station;
determining, by the terminal, a TTI bundling transmission policy of the terminal according to the transmission attribute of the terminal; and
sending, by the terminal, service data to the base station in a TTI bundling transmission manner according to the TTI bundling transmission policy of the terminal.

10. The method according to claim 9, wherein determining the TTI bundling transmission policy of the terminal according to the transmission attribute of the terminal comprises:
when the transmission attribute of the terminal indicates that the terminal supports a TTI bundle extended transmission manner, determining, by the terminal, that a maximum value of a quantity of resource blocks for the terminal to send service data to the base station in a TTI bundling transmission manner is A, wherein $3<A \leq 100$, and A is an integer.

11. The method according to claim 9, wherein determining the TTI bundling transmission policy of the terminal according to the transmission attribute of the terminal comprises:
when the transmission attribute of the terminal is a terminal category, and the terminal category is equal to i, determining, by the terminal, a maximum value of the quantity of resource blocks for the terminal to send service data to the base station in a TTI bundling transmission manner is F(i), wherein at least two F(i)s are not equal, $3 \leq F(i) \leq 100$, F(i) is an integer, $1 \leq i \leq 8$, and i is an integer.

12. The method according to claim 9, wherein determining the TTI bundling transmission policy of the terminal according to the transmission attribute of the terminal comprises:
when the transmission attribute of the terminal is a terminal category, and the terminal category is equal to i, determining, by the terminal, a maximum value of a size of a transport block for the terminal to send service data to the base station in a TTI bundling transmission manner is I(i), wherein at least two I(i)s are not equal, $16 \leq I(i) \leq 75376$, I(i) is an integer, $1 \leq i \leq 8$, and i is an integer.

13. The method according to claim 9, wherein determining the TTI bundling transmission policy of the terminal according to the transmission attribute of the terminal comprises:
when the transmission attribute of the terminal is a terminal category, and the terminal category is a machine-to-machine communication terminal, determining, by the terminal, a maximum value of a size of a transport block for the terminal to send service data to the base station in a TTI bundling transmission manner is L(i), wherein $1 \leq L(i) \leq 1000$, and L(i) is an integer.

14. The method according to claim 9, wherein determining the TTI bundling transmission policy of the terminal according to the transmission attribute of the terminal comprises:
when the transmission attribute of the terminal is a terminal category, and the terminal category is equal to i, determining, by the terminal, a maximum value of a size of a transport block for the terminal to send service data to the base station in a TTI bundling transmission manner is K(i), wherein at least two K(i)s are not equal, $1 \leq K(i) \leq 20$, K(i) is an integer, $1 \leq i \leq 8$, and i is an integer.

15. A base station comprising:
a receiver configured to receive a transmission attribute of a terminal from the terminal;
a processor configured to determine a transmission time interval (TTI) bundling transmission policy of the terminal according to the transmission attribute of the terminal,
wherein the transmission attribute indicates whether the terminal supports transmission by a TTI bundle extended transmission manner, a terminal category or a TTI bundling capability supported by the terminal, and
wherein the TTI bundling transmission policy is at least one of (a) a maximum value of a quantity of resource blocks, (b) a maximum value of a size of a transport block, (c) a quantity of TTIs in a TTI bundle and (d) a time length of a round trip time (RTT) in a TTI bundle;
a transmitter configured to send a TTI bundling transmission indication to the terminal; and
wherein the receiver is further configured to receive, according to the TTI bundling transmission policy, service data from the terminal.

16. The base station according to claim 15, wherein the processor determines the TTI bundling transmission policy by:
determining that a maximum value of a quantity of resource blocks for the terminal to send service data to the base station in a TTI bundling transmission manner is A, in a case where the transmission attribute of the terminal indicates that the terminal supports a TTI bundle extended transmission manner, wherein $3 < A \leq 100$, and A is an integer.

17. The base station according to claim 15, wherein the processor determines the TTI bundling transmission policy by:
determining a maximum value of the quantity of resource blocks for the terminal to send service data to the base station in a TTI bundling transmission manner is F(i), in a case where the transmission attribute of the terminal is a terminal category and the terminal category is equal to i, wherein at least two F(i)s are not equal, $3 \leq F(i) \leq 100$, F(i) is an integer, $1 \leq i \leq 8$, and i is an integer.

18. The base station according to claim 15, wherein the processor determines the TTI bundling transmission policy by:
determining a maximum value of a size of a transport block for the terminal to send service data to the base station in a TTI bundling transmission manner is I(i), in a case where the transmission attribute of the terminal is a terminal category equal to i, wherein at least two I(i)s are not equal, $16 \leq I(i) \leq 75376$, I(i) is an integer, $1 \leq i \leq 8$, and i is an integer.

19. The base station according to claim 15, wherein the processor determines the TTI bundling transmission policy by:
determining a maximum value of a size of a transport block for the terminal to send service data to the base station in a TTI bundling transmission manner is L(i), in a case where the transmission attribute of the terminal is a terminal category that is a machine-to-machine communication terminal, wherein $1 \leq L(i) \leq 1000$, and L(i) is an integer.

20. The base station according to claim 15, wherein the processor determines the TTI bundling transmission policy by:
determining a maximum value of a size of a transport block for the terminal to send service data to the base station in a TTI bundling transmission manner is M(i), in a case where the transmission attribute of the terminal is a terminal category that is not a machine-to-machine communication terminal, wherein $16 \leq M(i) \leq 75376$, and M(i) is an integer.

* * * * *